United States Patent
Betsugi

(10) Patent No.: US 12,544,168 B2
(45) Date of Patent: Feb. 10, 2026

(54) SURGICAL INSTRUMENT AND METHOD OF ASSEMBLING SURGICAL INSTRUMENT

(71) Applicant: MEDICAROID CORPORATION, Kobe (JP)

(72) Inventor: Shota Betsugi, Kobe (JP)

(73) Assignee: MEDICAROID CORPORATION, Kobe (JP)

( * ) Notice: Subject to any disclaimer, the term of this patent is extended or adjusted under 35 U.S.C. 154(b) by 888 days.

(21) Appl. No.: 17/023,367

(22) Filed: Sep. 17, 2020

(65) Prior Publication Data

US 2021/0093405 A1 Apr. 1, 2021

(30) Foreign Application Priority Data

Sep. 26, 2019 (JP) ................. 2019-175873

(51) Int. Cl.
| | | |
|---|---|---|
| A61B 34/00 | (2016.01) | |
| A61B 18/14 | (2006.01) | |
| A61B 34/37 | (2016.01) | |
| A61B 18/00 | (2006.01) | |
| A61B 34/30 | (2016.01) | |

(52) U.S. Cl.
CPC .......... *A61B 34/70* (2016.02); *A61B 18/1445* (2013.01); *A61B 34/37* (2016.02); *A61B 2018/0063* (2013.01); *A61B 2034/302* (2016.02); *A61B 2034/306* (2016.02)

(58) Field of Classification Search
CPC ..... A61B 34/70; A61B 34/37; A61B 18/1445; A61B 2034/302; A61B 2034/306; A61B 2018/0063
See application file for complete search history.

(56) References Cited

U.S. PATENT DOCUMENTS

| | | | |
|---|---|---|---|
| 5,810,876 A | 9/1998 | Kelleher | |
| 2004/0167515 A1* | 8/2004 | Petersen | A61B 34/71 606/49 |
| 2006/0074415 A1* | 4/2006 | Scott | A61B 34/71 606/45 |
| 2009/0216248 A1* | 8/2009 | Uenohara | A61B 17/29 606/130 |
| 2012/0209289 A1 | 8/2012 | Duque et al. | |
| 2013/0123805 A1* | 5/2013 | Park | A61B 46/10 606/130 |
| 2018/0055584 A1* | 3/2018 | Farritor | B25J 9/102 |
| 2018/0311000 A1 | 11/2018 | Ishihara et al. | |
| 2019/0282291 A1 | 9/2019 | Worrell et al. | |

FOREIGN PATENT DOCUMENTS

| | | |
|---|---|---|
| EP | 2095778 A1 | 9/2009 |
| EP | 3539495 A1 | 9/2019 |
| JP | 2011-45500 A | 3/2011 |
| JP | 2013-510664 A | 3/2013 |
| JP | 2018-187029 A | 11/2018 |
| WO | 2011/060054 A2 | 5/2011 |
| WO | 2020/044994 A1 | 3/2020 |

* cited by examiner

*Primary Examiner* — Michael F Peffley
*Assistant Examiner* — Bo Ouyang
(74) *Attorney, Agent, or Firm* — METROLEX IP LAW GROUP, PLLC; Robert L. Scott, Esq.

(57) ABSTRACT

A surgical instrument according to an embodiment may include: a shaft; a seal member disposed in a support body; and a pressing member including a pressing surface in contact with and pressing a surface of the seal member on a side of the shaft, wherein the pressing member is pressed by the shaft.

21 Claims, 11 Drawing Sheets

SURGICAL INSTRUMENT AND METHOD OF ASSEMBLING SURGICAL INSTRUMENT

CROSS REFERENCE TO RELATED APPLICATIONS

This application claims priority to Japanese Patent Application No. 2019-175873 filed on Sep. 26, 2019, the entire contents of which are incorporated herein by reference.

BACKGROUND

The disclosure may relate to a surgical instrument attached to a robot arm of a robot-assisted surgery system (hereinafter may be referred to as a robotic surgical instrument) and may especially relate to a surgical instrument including a support body and a shaft and a method of manufacturing the surgical instrument.

In a related art, there has been known a robotic surgical instrument including a support body and a shaft.

Japanese Patent Application Publication No. 2018-187029 discloses a medical treatment tool (a robotic surgical instrument) including a support body and a shaft. The medical treatment tool includes a wrist member and an end effector. The support body is attached to the shaft. The wrist member is rotatably attached to the support body. The end effector is rotatably attached to the wrist member.

The medical treatment tool disclosed in Japanese Patent Application Publication No. 2018-187029 is configured to, based on an operation by a surgeon or the like, rotate the wrist member attached to the support body and the end effector attached to the wrist member, so as to perform an endoscope surgery on a treatment target such as a human being, an animal, or the like.

SUMMARY

When performing the endoscope surgery, a gas filled in a body cavity of the treatment target may need to be prevented from leaking to the outside of the body from the treatment portion through the shaft. Thus, it may be necessary to arrange a seal member in the support body in such a manner that the seal member is pressed and compressed by the shaft.

However, if the size of the support body is small, the size of the seal member will also be small according to the size of the support body. This makes the surface of the seal member that is to be pressed by the shaft smaller, and may make it difficult to sufficiently press the seal member by the shaft. Therefore, even if the size of the support body is small, it may be desired that the seal member is sufficiently compressed by the shaft so as to more reliably seal the support body.

An object of an embodiment of the disclosure may be to provide a robotic surgical instrument capable of sufficiently compressing a seal member by a shaft so as to more reliably seal a support body.

A first aspect of the disclosure may be a surgical instrument to be attached to a robot arm. The surgical instrument may include: an end effector; an end effector support body that supports the end effector to be rotatable about a first axis; a support body that supports the end effector support body to rotatable about a second axis; a shaft to which the support body is connected; a seal member arranged in the support body; and a pressing member including a pressing surface in contact with and pressing a surface of the seal member on a side of the shaft, wherein the pressing member is pressed by the shaft.

A second aspect of the disclosure may be a surgical instrument to be attached to a robot arm. The surgical instrument may include: an end effector; a first support body that supports the end effector to be rotatable about a first axis with respect to the first support body; a second support body that supports the first support body to rotatable about a second axis with respect to the second support body; a shaft to which the second support body is connected, a seal member provided in the second support body; and a pressing member including a pressing surface being in surface contact with and pressing a surface of the seal member on the shaft side, wherein the pressing member is pressed by the shaft.

A third aspect of the disclosure may be a method of assembling a surgical instrument, wherein the surgical instrument includes: an end effector; a first support body that supports the end effector to be rotatable about a first axis; a second support body that supports the first support body to rotatable about a second axis; and a shaft to which the second support body is connected.

The method of assembling the surgical instrument may include: disposing a seal member in the second support body; moving a pressing member in an axial direction of the shaft along a cutout of the second support body; and pressing and compressing the seal member against the second support body by moving the pressing member in the axial direction of the shaft.

DETAILED DESCRIPTION

Figure 1:
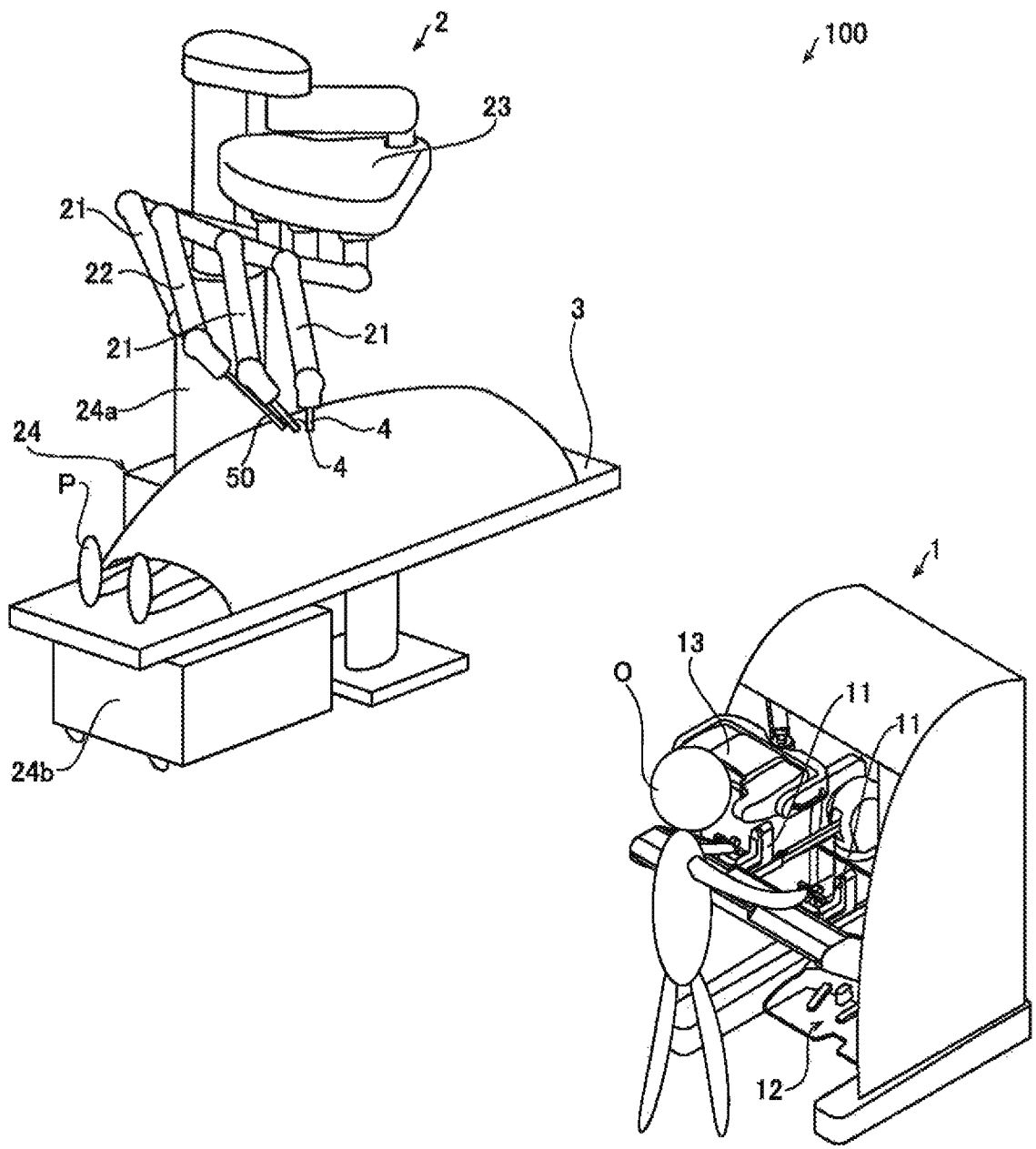
FIG. 1 is a diagram illustrating an overview of a robotic surgical system according to an embodiment.

Descriptions are provided hereinbelow for one or more embodiments based on the drawings. In the respective drawings referenced herein, the same constituents are designated by the same reference numerals and duplicate explanation concerning the same constituents is omitted. All of the drawings are provided to illustrate the respective examples only.

(Configuration of Robotic Surgical System)

The configuration of a robotic surgical system 100 is described with reference to FIGS. 1 and 2.

As illustrated in FIG. 1, the robotic surgical system 100 includes a remote control apparatus 1 and a patient-side apparatus 2. The remote control apparatus 1 is provided to remotely control medical equipment provided to the patient-side apparatus 2. When an operator O such as a surgeon or the like inputs an action mode instruction to be executed by the patient-side apparatus 2, to the remote control apparatus 1, the remote control apparatus 1 transmits the action mode instruction to the patient-side apparatus 2. In response to the action mode instruction transmitted from the remote control apparatus 1, the patient-side apparatus 2 operates medical equipment, including surgical instruments 4 attached to robot arms 21 and an endoscope 50 attached to a robot arm 22. This allows for minimally invasive surgery.

The patient-side apparatus 2 is positioned beside an operation table 3 on which the patient P is laid. The patient-side apparatus 2 constitutes an interface to perform a surgery for a patient P in response to an input from the remote control apparatus 1. The patient-side apparatus 2 includes plural robot arms 21, a robot arm 22, a platform 23, a positioner 24, and a controller (not illustrated).

Each of the plural robot arms 21 includes plural joints. Each joint of the robot arm 21 includes a driver (not illustrated) provided with a servo-motor and a position detector such as an encoder. The robot arms 21 are configured so that the medical equipment attached to each robot arm 21 is controlled by a driving signal given through the controller and performs a desired movement. Note that the robot arm 22 has a configuration same as the robot arm 21.

The surgical instruments 4 as the medical equipment are detachably attached to the distal end portions of the robot arms 21. In surgeries using the patient-side apparatus 2, the robot arms 21 introduce the surgical instruments 4 into the body of the patient P through a cannula (trocar) placed on the body surface of the patient P.

One of the surgical instruments 4 is a monopolar scissors and includes: a housing 41 (see FIG. 3), which is attached to the robot arm 21; an elongated shaft 42 (see FIG. 3); and an end effector 43 (see FIG. 3), which is provided at the distal end portion of the shaft 42. Note that the surgical instrument 4 may be a surgical instrument other than the monopolar scissors. For example, the surgical instrument 4 may be a surgical instrument 4 including an end effector 43 such as grasping forceps, scissors, a hook, a high-frequency knife, a snare wire, a clamp, or a stapler, for example. The end effector 43 of the surgical instrument 4 is then located near the surgery site (treatment site).

To the distal end of the robot arm 22, the endoscope 50 as medical equipment is detachably attached. The endoscope 50 captures an image within the body cavity of the patient P. The captured image is outputted to the remote control apparatus 1. The endoscope 50 is a 3D endoscope capable of capturing a three-dimensional image or a 2D endoscope. In surgeries using the patient-side apparatus 2, the robot arm 22 introduces the endoscope 50 into the body of the patient P through a trocar placed on the body surface of the patient P. The endoscope 50 is then located near the surgery site.

The platform 23 commonly supports the robot arms 21 and the robot arm 22. The positioner 24 is placed on the floor of an operation room and supports the platform 23. The positioner 24 includes a column 24a including an elevating shaft adjustable in the vertical direction and a base 24b including wheels and thus being movable on the floor surface.

The remote control apparatus 1 constitutes the interface with the operator O. The remote control apparatus 1 is an apparatus that allows the operator O to operate the surgical instruments 4 attached to the robot arms 21 and the endoscope 50 attached to the robot arm 22. Specifically, the remote control apparatus 1 is configured to transmit action mode instructions which are inputted by the operator O and are to be executed by the surgical instruments 4 and endoscope 50, to the patient-side apparatus 2 through the controller. The remote control apparatus 1 is installed beside the operation table 3 so that the operator O can see the condition of the patient P very well while operating the remote control apparatus 1, for example. The remote control apparatus 1 may be configured to transmit action mode instructions wirelessly and installed in a room different from the operation room where the operation table 3 is installed.

The action modes to be executed by the surgical instruments 4 include modes of actions to be taken by each surgical instrument 4 (a series of positions and postures) and actions to be executed by the function of each surgical instrument 4. When the surgical instrument 4 is a pair of grasping forceps, for example, the action modes to be executed by the surgical instrument 4 include roll and pitch positions of the wrist of the end effector 43 and actions to open and close the jaws. When the surgical instrument 4 is a high-frequency knife, the action modes to be executed by the surgical instrument 4 may include vibration of the high-frequency knife, specifically, supply of current to the high-frequency knife. When the surgical instrument 4 is a snare wire, the action modes to be executed by the surgical instrument 4 may include a capturing action and an action to release the captured object. Further the action modes may include an action to supply current to a bipolar or monopolar instrument to burn off the surgery site.

The action modes to be executed by the endoscope 50 include, for example, an action mode to move the position and posture of the distal end of the endoscope 50 and an action mode to set the zoom magnification, for example.

Figure 2:
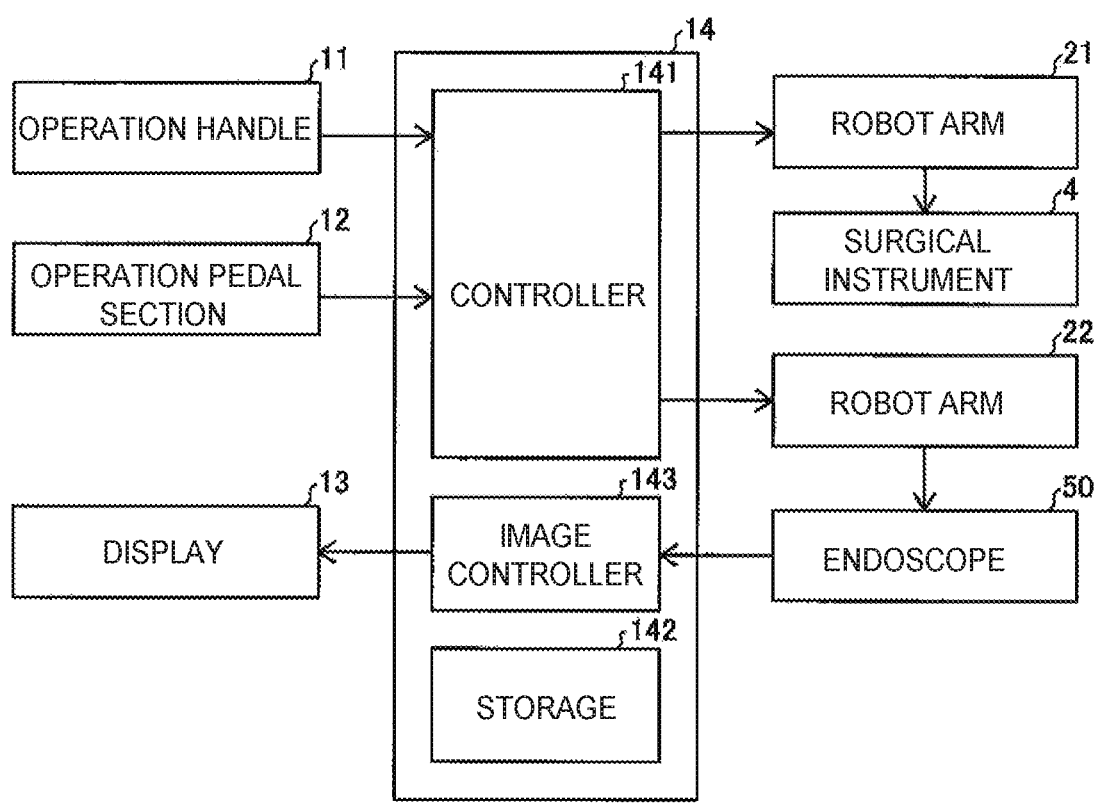
FIG. 2 is a block diagram illustrating a view of a control-related configuration of the robotic surgical system according to an embodiment.

As illustrated in FIGS. 1 and 2, the remote control apparatus 1 includes operation handles 11, an operation pedal section 12, a display part 13, and a control apparatus 14.

The operation handles 11 are provided in order to remotely operate medical equipment (surgical instruments 4 and the endoscope 50) attached to the robot arms 21 and 22. Specifically, the operation handles 11 accept operations by the operator O for operating the medical equipment. The operation handles 11 include two operation handles 11 arranged side by side in the horizontal direction. One of the two operation handles 11 is operated by the right hand of the operator O while the other operation handle 11 is operated by the left hand of the operator O.

The operation handles 11 extend from the rear side of the remote control apparatus 1 toward the front side. The operation handles 11 are configured to move in a predetermined three-dimensional operation region. Specifically, the operation handles 11 are configured so as to move up and down, right and left, and forward and rearward.

The remote control apparatus 1 and patient-side apparatus 2 constitute a master-slave system in terms of controlling movement of the robot arms 21 and robot arm 22. The operation handles 11 constitute an operating part on the master side in the master-slave system. The robot arms 21 and robot arm 22 holding medical equipment constitute an operating section on the slave side. When the operator O operates the operation handles 11, the movement of the robot arms 21 or 22 is controlled so that the distal end portions (the end effectors 43 of the surgical instruments 4) of the robot arms 21 or the distal end portion (the endoscope 50) of the robot arm 22 moves following the movement of the operation handles 11. In this way, the operations of the robot arms 21 and the robot arm 22 are controlled.

The patient-side apparatus 2 controls the movement of the robot arms 21 in accordance with the set motion scaling ratio. When the motion scaling ratio is set to ½, for example, the end effectors 43 of the surgical instruments 4 move ½ of the movement distance of the operation handles 11. This allows for precise fine surgery.

The operation pedal section 12 includes plural pedals to execute medical equipment-related functions. The plural pedals include a coagulation pedal, a cutting pedal, a camera pedal, and a clutch pedal. The plural pedals are operated by a foot of the operator O.

The coagulation pedal enables the surgical instrument 4 to coagulate a surgery site. Specifically, when the coagulation pedal is operated, voltage for coagulation is applied to the surgical instrument 4 to coagulate a surgery site. The cutting pedal enables the surgical instrument 4 to cut a surgery site. Specifically, the cutting pedal is operated to apply voltage for cutting to the surgical instrument 4 and cut a surgery site.

The camera pedal is used to control the position and orientation of the endoscope 50 that captures images within the body cavity. Specifically, the camera pedal enables operation of the endoscope 50 by the operation handles 11. The position and orientation of the endoscope 50 are controllable by the operation handles 11 while the camera pedal is being pressed. The endoscope 50 is controlled by using both of the right and left operation handles 11, for example. Specifically, when the operator O rotates the right and left operation handles 11 about the middle point between the right and left operation handles 11, the endoscope 50 is rotated. When the operator O presses the right and left operation handles 11 together, the endoscope 50 goes forward into the body cavity. When the operator O pulls the right and left operation handles 11 together, the endoscope 50 goes back. When the operator O moves the right and left operation handles 11 together up, down, right, or left, the endoscope 50 moves up, down, right, or left, respectively.

The clutch pedal is used to temporarily disconnect operation-related connection between the operation handles 11 and the robot arms 21 and 22 to stop movement of the surgical instruments 4. Specifically, when the clutch pedal is being pressed, the robot arms 21 and 22 of the patient-side apparatus 2 do not work even if the operation handles 11 are operated. For example, when the operation handles 11 are operated and moved to the edge of the range of movement, the operator O operates the clutch pedal to temporarily disconnect the operation-related connection and then returns the operation handles 11 to the center of the range of movement. When the operator O stops operating the clutch pedal, the operation handles 11 are again connected to the robot arms 21 and 22. The operator O restarts the operation for the operation handles 11 around the center thereof.

The display part 13 or a display is configured to display images captured by the endoscope 50. The display part 13 includes a scope type display section or a non-scope type display section. The scope type display section is a display section that the operator O looks into. The non-scope type display section is a display section like an open-type display section that includes a flat screen and the operator O is able to see without looking into, such as normal displays for personal computers.

When the scope type display section is attached, the scope type display section displays 3D images captured by the endoscope 50 attached to the robot arm 22 of the patient-side apparatus 2. When the non-scope type display section is attached, the non-scope type display section also displays 3D images captured by the endoscope 50 provided for the patient-side apparatus 2. The non-scope type display section may display 2D images captured by the endoscope 50 provided for the patient-side apparatus As illustrated in FIG. 2, the control apparatus 14 includes a controller 141, a storage 142, and an image controller 143, for example. The controller 141 includes a calculator such as a CPU. The storage 142 includes a memory, such as a ROM (Read Only Memory) and a RAM (Random Access Memory). The control apparatus 14 may be composed of a single controller performing centralized control or may be composed of plural controllers that perform decentralized control in cooperation with each other.

The controller 141 determines whether an action mode instruction inputted by the operation handles 11 is to be executed by the surgical instruments 4 or to be executed by the endoscope 50, depending on the state of the operation pedal section 12. When determining that the action mode instruction inputted by the operation handles 11 is to be executed by any one of the surgical instruments 4, the controller 141 transmits the action mode instruction to the corresponding robot arm 21. The robot arm 21 is thereby driven for controlling movement of the surgical instrument 4 attached to the robot arm 21.

When determining that the action mode instruction inputted by the operation handles 11 is to be executed by the endoscope 50, the controller 141 transmits the action mode instruction to the robot arm 22. The robot arm 22 is thereby driven for control of movement of the endoscope 50 attached to the robot arm 22.

The storage 142 stores control programs corresponding to the types of the surgical instrument 4, for example. The controller 141 reads the stored control programs according to the types of the attached surgical instruments 4. The action mode instruction from at least one of the operation handles 11 and the operation pedal section 12 of the remote control apparatus 1 thereby cause the respective surgical instruments 4 to perform proper movements.

The image controller 143 transmits images acquired by the endoscope 50 to the display part 13. The image controller 143 performs processing and alternations for the images when needed.

(Configuration of Surgical Instrument, Adaptor, Drape, and Robot Arm)

With reference to FIGS. 3 to 6, the configurations of the surgical instrument 4, adaptor 5, drape 6, and robot arm 21 are described.

Here, the direction in which the surgical instrument 4 (the direction in which the shaft 42 extends) is defined as a Y direction, the distal side (the side toward the end effector 43) of the surgical instrument 4 along the Y direction is defined as a Y1 direction, and the opposite side of the Y1 direction is defined as a Y2 direction. The direction in which the surgical instrument 4 and the adaptor 5 are adjacent to each other is defined as a Z direction, the surgical instrument 4 side along the Z direction is defined as a Z1 direction, and the opposite side of the Z1 direction is defined as a Z2 direction. Further, the direction orthogonal to the Y direction and the Z direction is referred to as an X direction, one side along the X direction is referred as an X1 direction, and the other side along the X direction is referred to as an X2 direction. The radial direction of the shaft 42 is referred to as the D direction, and the circumferential direction of the shaft 42 is referred to as the R direction.

Figure 3:
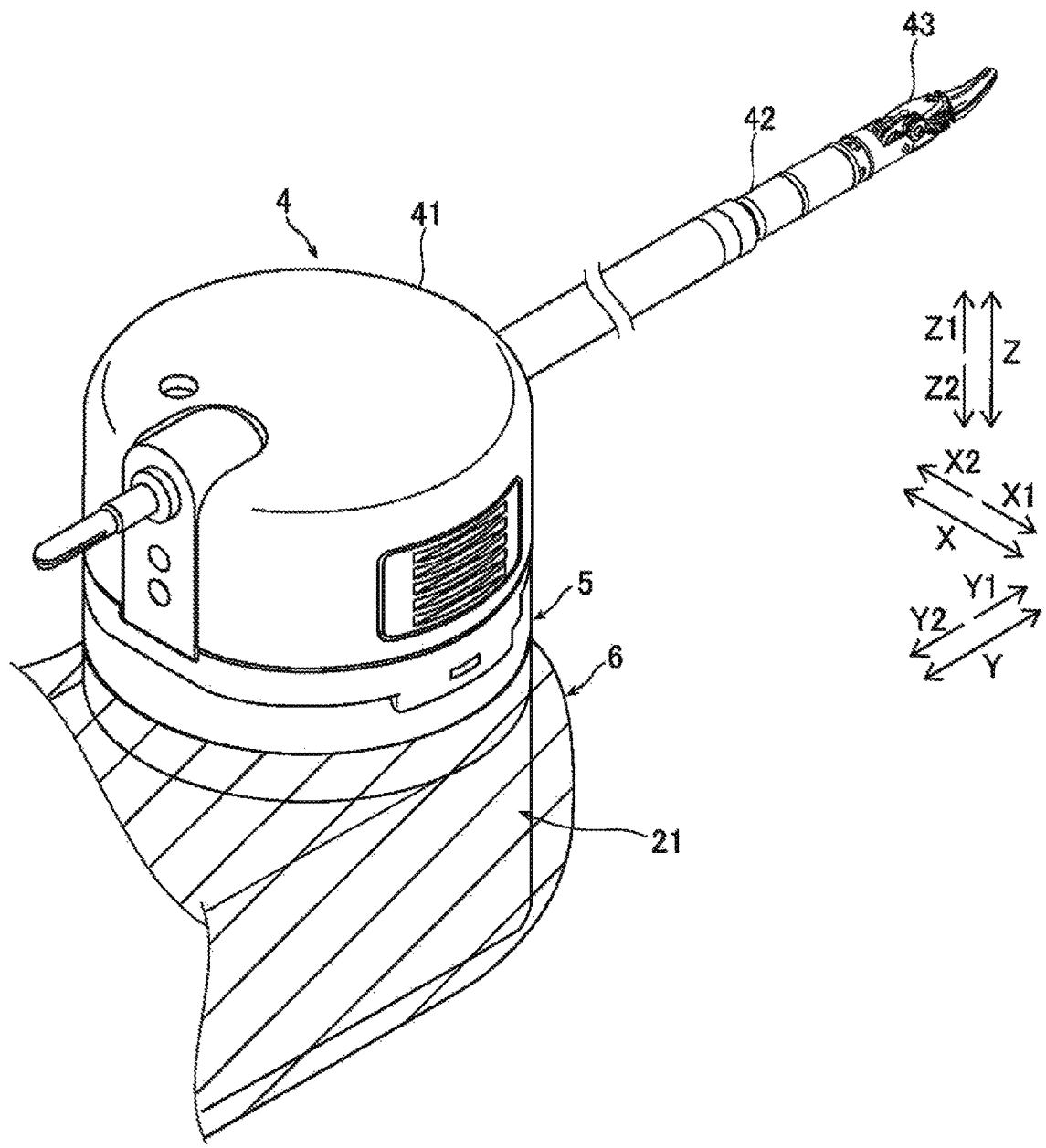
FIG. 3 is a diagram illustrating a perspective view of a state where a surgical instrument is attached to a robot arm through an adaptor according to an embodiment.
Figure 4:
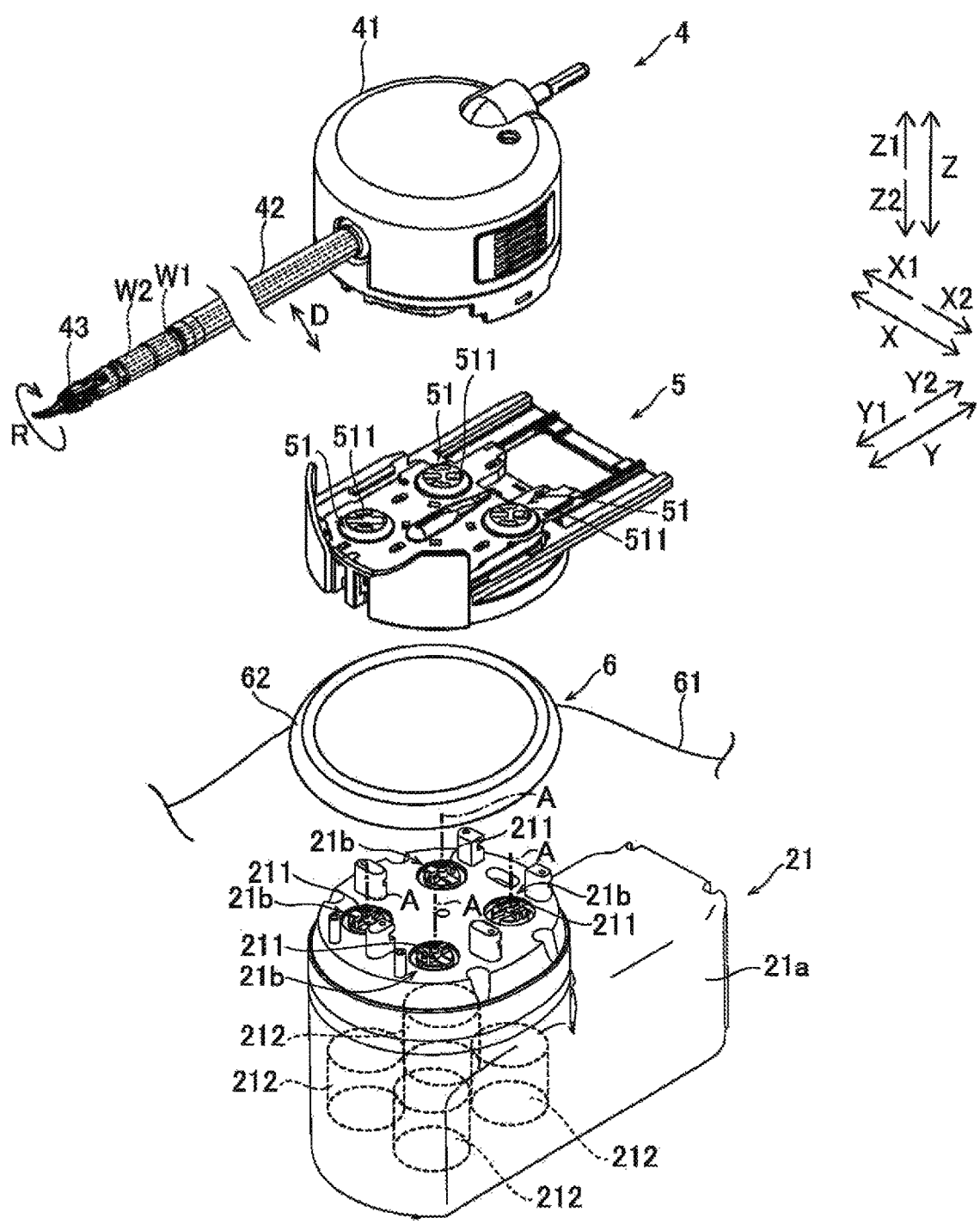
FIG. 4 is a diagram illustrating an exploded perspective of a state where the surgical instrument is to be attached to the robot arm through the adaptor according to an embodiment.

As illustrated in FIGS. 3 to 4, the surgical instrument 4 is detachably connected to the robot arm 21 through the adaptor 5. The adaptor 5 is a drape adaptor configured to sandwich a sterile drape 6 to cover the robot arm 21, in conjunction with the robot arm 21. That is, the adaptor 5 is configured such that the drape 6 is attachable to the adaptor 5.

The surgical instrument 4 is attached to the Z1 side of the adaptor 5. The adaptor 5 is attached to the Z1 side of the robot arm 21.

The robot arm 21 is used in the clean area and is thus covered with the drape 6. In operation rooms, clean technique is used in order to prevent surgical incision sites and medical equipment from being contaminated by pathogen, foreign matters, or the like. The clean technique defines a clean area and a contaminated area, which is other than the clean area. The surgery sites are located in the clean area. Members of the surgical team, including the operator O, make sure that only sterile objects are placed in the clean area during surgery and perform sterilization for an object which is to be moved to the clean area from the contaminated area. Similarly, when the assistant, as one of the members of the surgical team including the operator O, place their hands in the contaminated area, the members sterilize their hands before directly touching objects located in the clean area. Instruments used in the clean area are covered with the drape 6 sterilized or to be sterilized.

As illustrated in FIG. 4, the drape 6 includes a body section 61 that covers the robot arm 21 and an attachment section 62 sandwiched between the robot arm 21 and the adaptor 5. The body section 61 is made of a flexible film member. The flexible film member is made of a resin material, such as thermoplastic polyurethane and polyethylene. The body section 61 includes an opening so that the robot arm 21 is engaged with the adaptor 5. In the opening of the body section 61, the attachment section 62 is provided so as to close the opening. The attachment section 62 is made of a resin mold member. The resin mold member is made of a resin member such as polyethylene terephthalate. The attachment section 62 is harder (less flexible) than the body section 61. The attachment section 62 includes an opening so that the robot arm 21 is engaged with the adaptor 5. The opening of the attachment section 62 may be provided corresponding to the section where the robot arm 21 is engaged with the adaptor 5. The opening of the attachment section 62 may include plural openings corresponding to plural sections at which the robot arm 21 is engaged with the adaptor 5.

Figure 5:
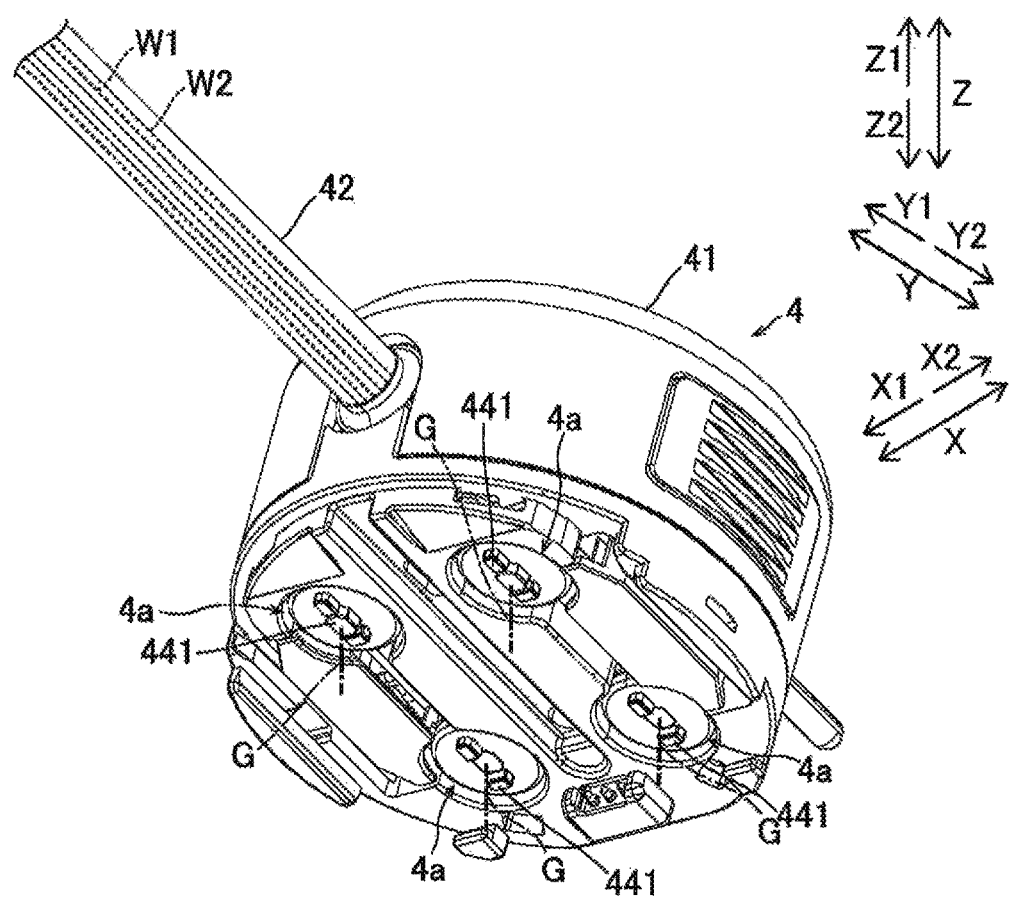
FIG. 5 is a diagram illustrating a perspective view of the surgical instrument according to an embodiment.

As illustrated in FIGS. 4 and 5, the surgical instrument 4 includes the plural (four) driven members 4a. The driven members 4a are provided within the housing 41 and are rotatable about the respective rotation axes G extending along the Z axis. The plural driven members 4a are provided to operate (drive) the end effector 43. For example, the driven members 4a are connected to the end effector 43 with wires (first elongate element W1 and second elongate element W2 described later) inserted through the shaft 42. With this, rotations of the driven members 4a drive the wires, which operate (drive) the end effector 43. In addition, the driven member 4a is connected to the shaft 42 through gears (not illustrated), for example. With this, the shaft 42 is rotated with rotation of the driven member 4a, and the end effector 43 is rotated with rotation of the shaft 42.

To transmit driving forces from the robot arm 21 to the end effector 43, the driven members 4a include engagement projections 441, which are engaged with later-described drive transmission members 51 of the adaptor 5. The engagement projection 441 is projected from the Z2 side surface of the driven member 4a toward the side of the adaptor 5 (the Z2 side). Each of the engagement projections 441 has a shape corresponding to the corresponding engagement recess 511 (see FIG. 4) of the adaptor 5 and having projected portions arranged in line. Each of the engagement projections 441 has a line-symmetric shape.

Figure 6:
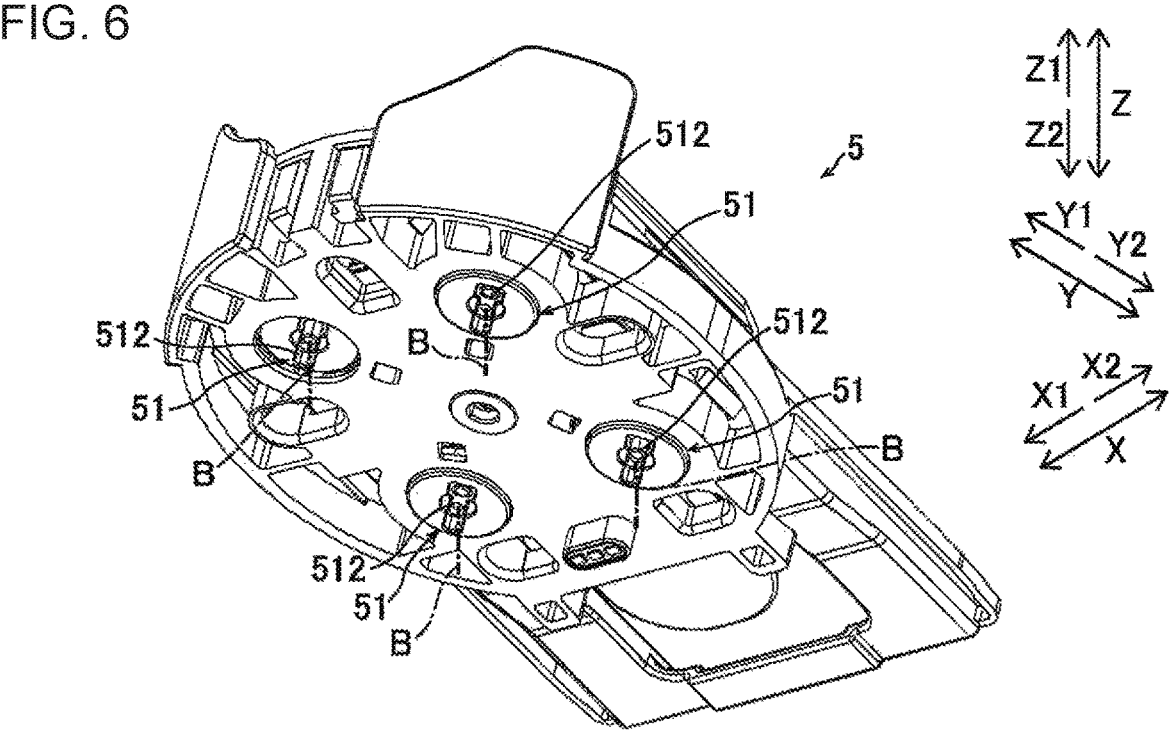
FIG. 6 is a diagram illustrating a perspective view of the adaptor according to an embodiment.

As illustrated in FIGS. 4 and 6, the adaptor 5 includes a plurality (four) of the drive transmission members 51. The drive transmission members 51 are configured to transmit driving forces from the robot arm 21 to the driven members 4a of the surgical instrument 4. That is, the drive transmission members 51 are provided so as to correspond to the driven members 4a of the surgical instrument 4. The drive transmission members 51 are rotatable about the respective rotation axes B, which extend along the Z direction.

As illustrated in FIG. 4, each of drive transmission members 51 includes the engagement recess 511 which is respectively engaged with the engagement projection 441 of the corresponding driven member 4a of the surgical instrument 4. The engagement recess 511 is located at the surgical instrument 4 side (the Z1 side) of the drive transmission member 51 and is recessed from the Z1 side surface of the drive transmission member 51, toward the Z2 direction, opposite to the surgical instrument 4. Each of the engagement recesses 511 has a line-symmetric shape.

As illustrated in FIG. 6, each of the drive transmission members 51 includes an engagement recess 512, which is engaged with an engagement projection 211 of the corresponding drive part 21b of the robot arm 21. The engagement recess 512 is located at the robot arm 21 side (the Z2 side) of the drive transmission member 51. The engagement recess 512 is recessed from the Z2 side surface of the drive transmission member 51, toward the Z1 direction, opposite to the robot arm 21. The plural drive transmission members 51 include substantially the same configuration. Each of the engagement recesses 512 has a line-symmetric shape.

As illustrated in FIG. 4, the robot arm 21 includes the frame 21a and the plural (four) drive parts 21b. Each of the drive parts 21b is attached to the frame 21a of the robot arm 21. The plural drive parts 21b are provided corresponding to the plural (four) drive transmission members 51 of the adaptor 5. Each of the drive parts 21b has the same or a similar configuration, and thus only one of the drive parts 21b is described below to avoid redundancy.

Each of the drive parts 21b includes the engagement projection 211 and an actuator 212.

The engagement projection 211 of each drive part 21b is engaged with the engagement recess 512 of the corresponding drive transmission member 51 (see FIG. 6). Each of the engagement projections 211 is projected from the Z1 side surface of the drive part 21b toward the Z1 side (the adaptor 5 side). Each of the engagement projections 211 has a line-symmetric shape.

The actuator 212 includes a motor. The actuator 212 is configured to drive the engagement projection 211 to rotate about the rotational axis A extending in the Z direction. Thereby, the drive transmission member 51 of the adaptor 5 engaged with the engagement projection 211 can be rotated about the rotational axis B extending in the Z direction, and the driven member 4a of the surgical instrument 4 engaged with the drive transmission member 51 can be rotated about the rotational axis G. Note that the rotational axis A, the rotational axis B, and the rotational axis G are coaxially arranged.

(Detailed Explanation of Surgical Instrument)

With reference to FIGS. 7 to 22, the surgical instrument 40 is described in detail. The surgical instrument 4 according to an embodiment is configured to prevent gas (such as carbon dioxide, etc.) filled in a body cavity of the patient for the surgery in an abdominal cavity or the like from leaking out of a treatment portion where the surgical instrument 4 is inserted. That is, the surgical instrument 4 is configured to prevent the gas filled in the body cavity of the patient from leaking into the surgical instrument 4 and thus prevent the gas from passing through the surgical instrument 4 to the outside of the body of the patient.

Figure 7:
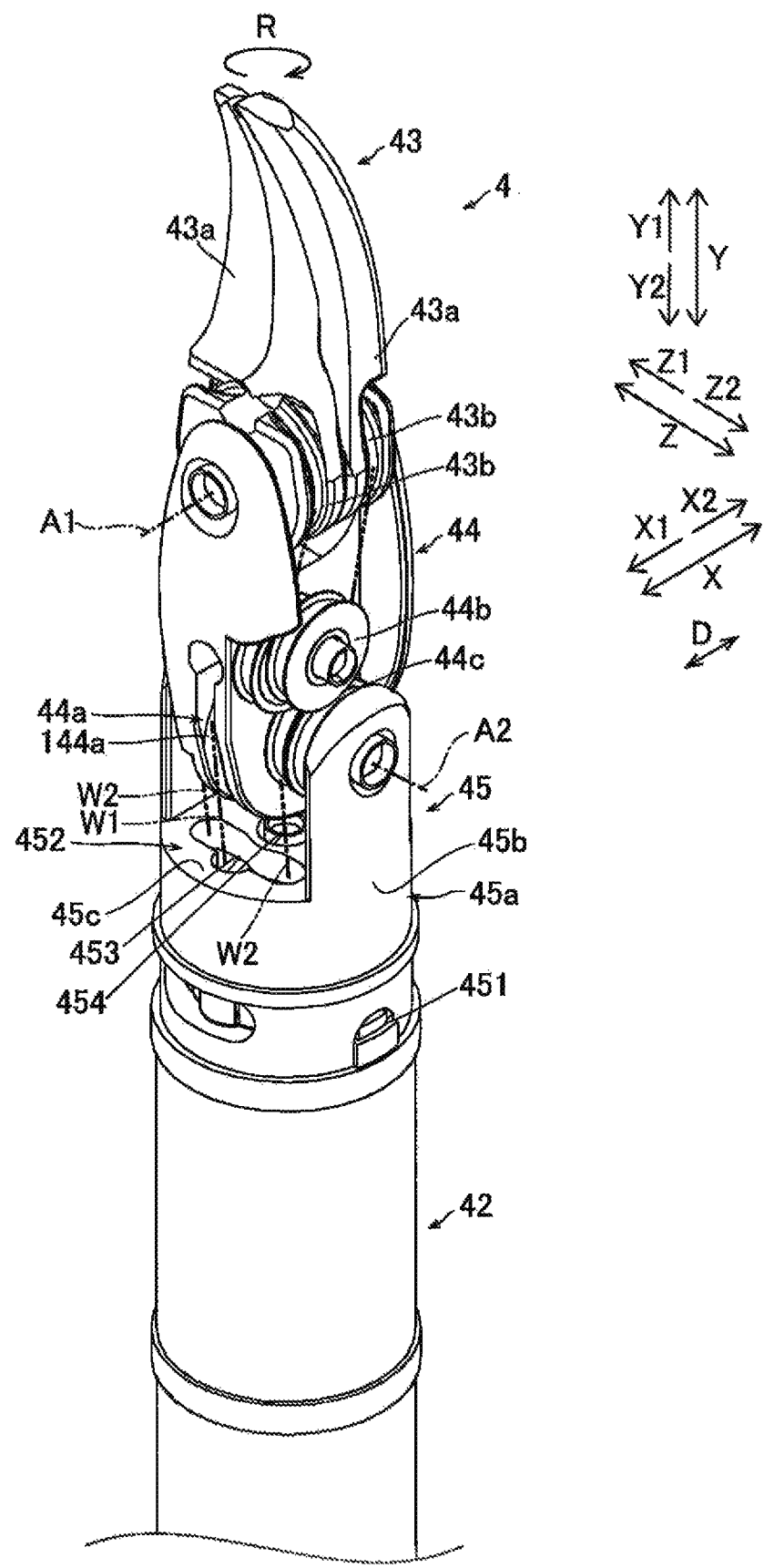
FIG. 7 is a diagram illustrating a perspective view of a shaft and an end effector according to an embodiment.
Figure 8:
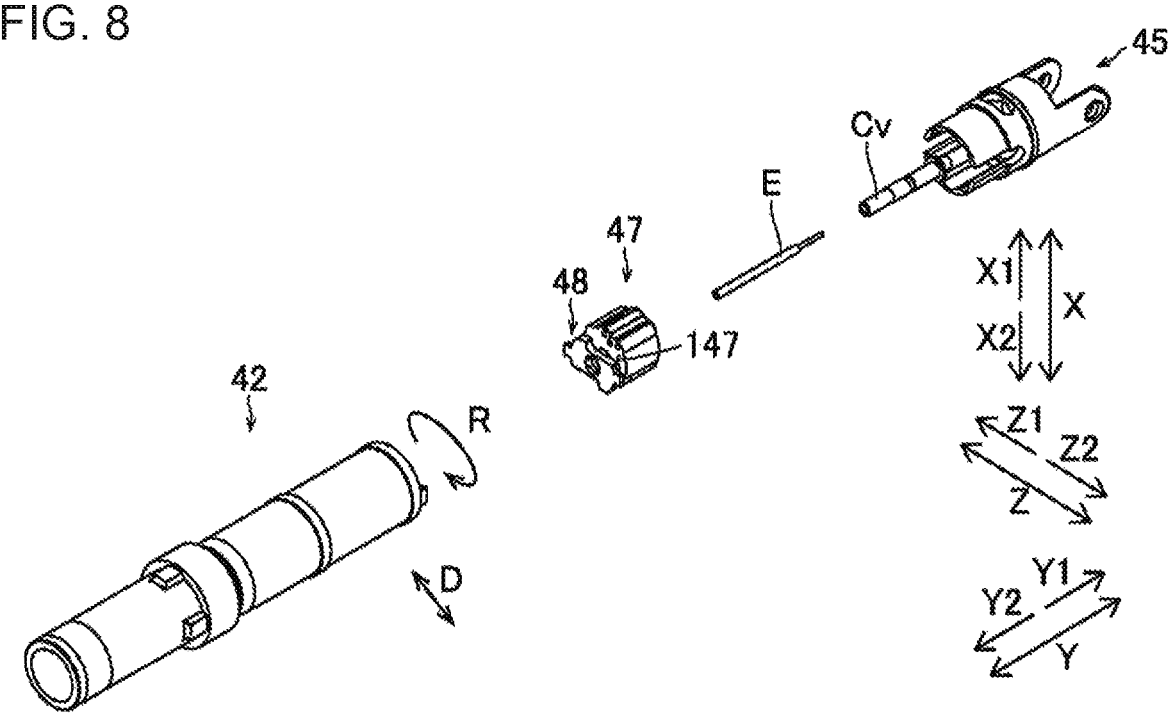
FIG. 8 is a diagram illustrating an exploded perspective view of the surgical instrument according to an embodiment as seen from the Y2 direction.

As illustrated in FIGS. 7 and 8, the surgical instrument 4 includes the end effector 43, an end effector support body 44 serving as a first support body supporting the end effector 43 to be rotatable about a first axis A1, a base 45 (clevis) serving as a second support body supporting the end effector support body 44 to be rotatable about a second axis A2, and the shaft 42 connected to the base 45. The surgical instrument 4 includes a seal member 47. The seal member 47 is provided in the base 45 and prevents the gas filled in the body cavity of the patient P from leaking out of the body from the treatment portion via the shaft 42. The surgical instrument 4 includes a retainer 48 serving as a pressing member (see FIG. 14). The retainer 48 includes a pressing surface 48a that abuts a surface 147 of the seal member 47 on the shaft 42 side (the Y2 side) and presses the surface 147 in the D direction in an area from a center portion to an outer side portion of the surface 147. The base 45 is an example of a support body in this disclosure. The retainer 48 is an example of a pressing member in this disclosure.

With this, even when the size of the seal member 47 is small because the size of the base 45 is small, it is possible to sufficiently press the surface 147 of the seal member 47 on the shaft 42 side by the shaft 42 via the pressing surface 48a of the retainer 48 toward the end effector 43 side so as to more reliably compress the seal member 47 by the shaft 42. As a result, even when the size of the base 45 is small, it is possible to sufficiently compress the seal member 47 by the shaft 42 toward the end effector 43 side so as to more reliably seal the base 45.

Specifically, the end effector 43 includes plural (two) end effector members 43a. That is, the plural end effector members 43a are attached to the end effector support body 44 such that the plural end effector members 43a are rotatable about the first axis A1 with respect to the end effector support body 44. Each of the end effector members 43a includes a pulley section 43b. Each of the end effector members 43a is configured to change its posture as a second elongate element W2 wound around the pulley section 43b thereof moves. In this example, the end effector 43 is a scissors. With this structure, even in a case where the scissors whose base 45 is smaller than those of other types of end effectors is used as an end effector 43, the seal member 47 can be sufficiently pressed by the shaft 42 via the retainer 48. The end effector 43 may be an end effector other than a scissors.

The end effector support body 44 includes a pulley section 44a, a first pulley group 44b, and a second pulley group 44c. The pulley section 44a is supported by the base 45 to be rotatable about the second axis A2 with respect to the base 45. The pulley section 44a includes a pulley groove 144a formed along a circumferential direction of the second axis A2. The end effector support body 44 is configured to change its posture as a first elongate element W1 wound around the pulley section 44a thereof moves.

The first pulley group 44b and the second pulley group 44c guide the second elongate elements W2 engaged with the pulley section 43b of the end effector member 43a. The first pulley group 44b is arranged between the second axis A2 and the first axis A1. The second pulley group 44c is arranged on the second axis A2.

Here, the first elongate element W1 and the second elongate elements W2 are composed of a wire or a cable. The wire or the cable is made of a metal such as stainless or tungsten. The number of the first elongate element(s) W1 is set corresponding to the number of the pulley section(s) 44a. In this example, the number of the first elongate element(s) W1 is one. The number of the second elongate element(s) W2 is set corresponding to the number of the end effector members 43a. In this example, the number of the second elongate element(s) W2 is two.

Figure 9:
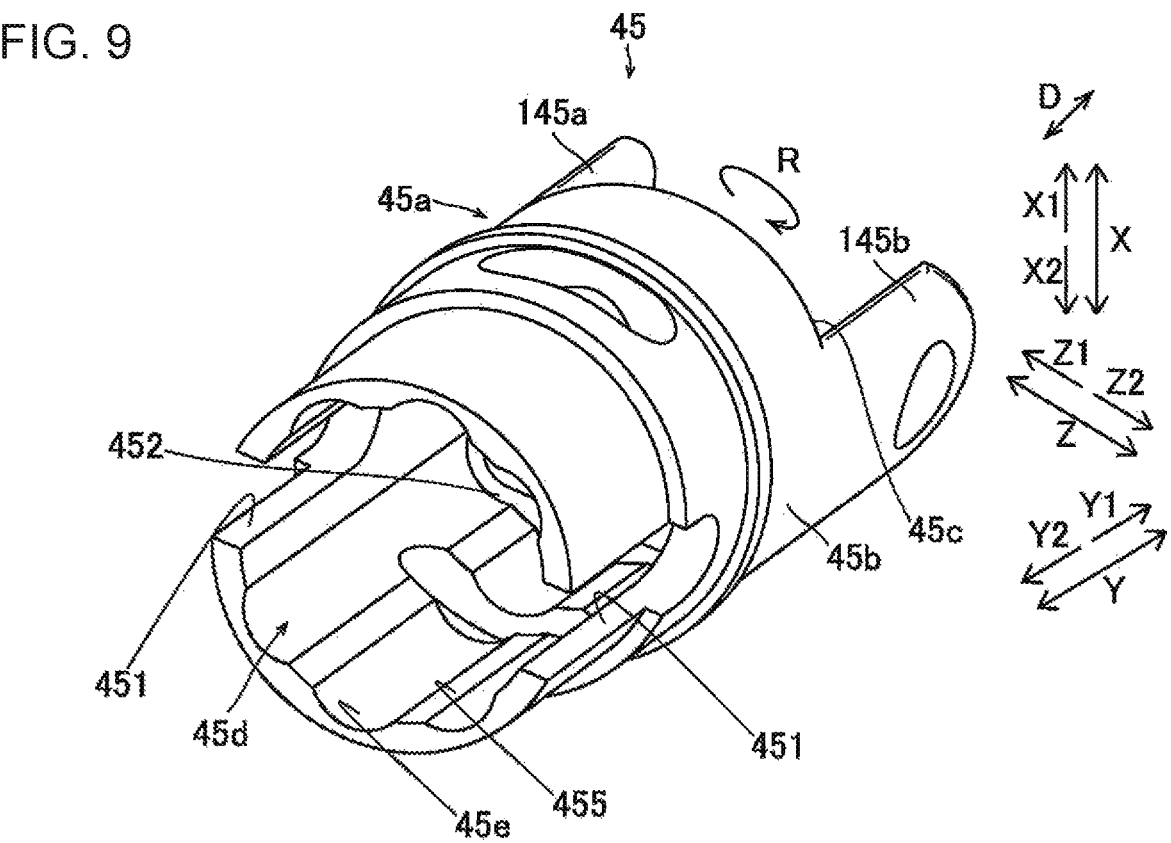
FIG. 9 is a diagram illustrating a perspective view of a base according to an embodiment.
Figure 10:
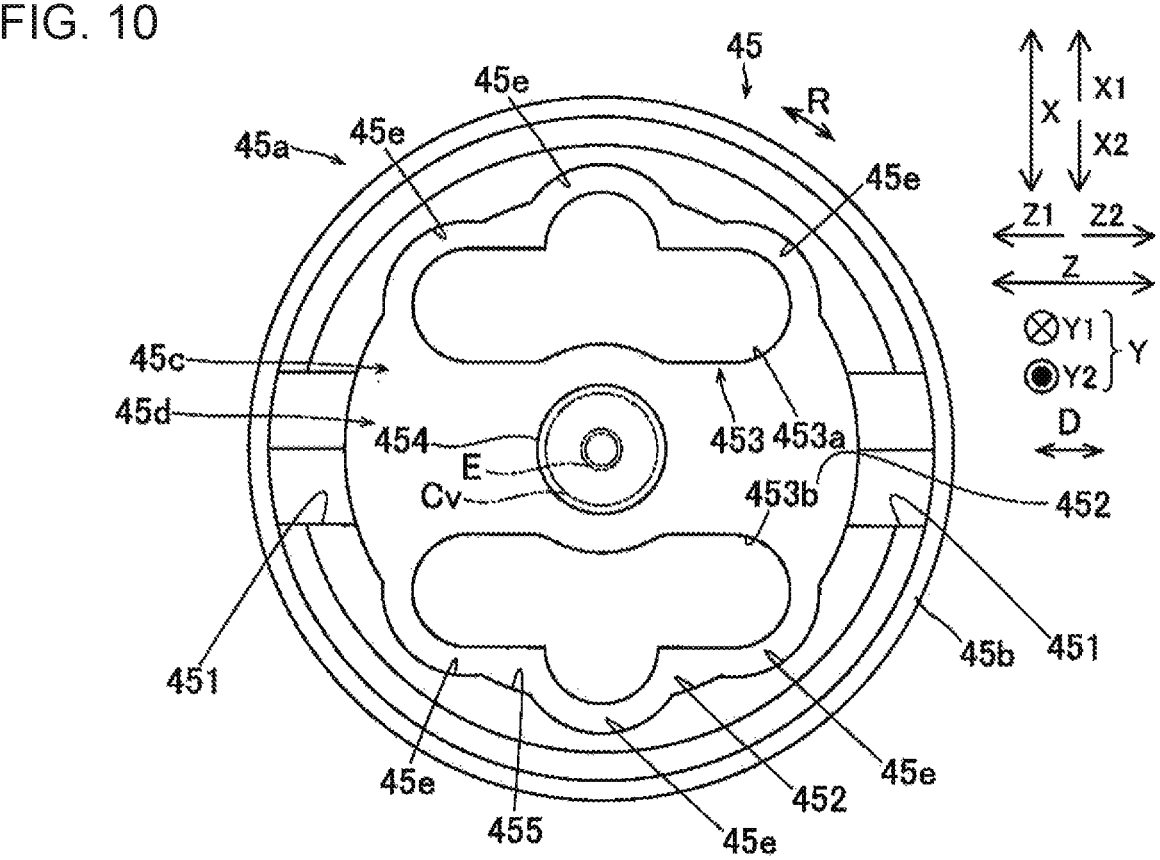
FIG. 10 is a diagram illustrating a bottom view of the base according to an embodiment.

As illustrated in FIGS. 9 and 10, the base 45 includes a connection base portion 45a formed with cutouts 451 or recesses.

The connection base portion 45a is formed in a substantially cylindrical shape. The connection base portion 45a is connected to the shaft 42. Specifically, an end portion of the shaft 42 on the Y1 side is connected to an end portion of the connection base portion 45a on the Y2 side. The connection base portion 45a includes a circumferential wall 45b extending along the R direction and a partition wall 452 provided in an end portion of the connection base portion 45a on the side opposite to the shaft 42 (an end portion on the Y1 side). The cutouts 451 are formed in the circumferential wall 45b. The cutouts 451 are recessed from the end of the base 45 on the shaft 42 side toward the end effector 43 side in the Y direction (the axial direction of the shaft 42).

The connection base portion 45a includes a first support portion 145a and a second support portion 145b which rotatably support the end effector support body 44. The first support portion 145a protrudes in the Y1 direction from an end portion of the connection base portion 45a on the Z1 side. The second support portion 145b protrudes in the Y1 direction from an end portion of the connection base portion 45a on the Z2 side.

The connection base portion 45a includes an inner space 45d surrounded by the circumferential wall 45b and the partition wall 452. The inner space 45d of the connection base portion 45a is opened toward the Y2 side.

The partition wall 452 includes an end surface 45c on the opposite side of the shaft 42 (the Y1 side), communication holes 453, and a through hole 454. The partition wall 452 is configured to separate the inner space 45d and the outer space of the connection base portion 45a. The communication holes 453 penetrate through the partition wall 452 in the Y direction. The communication holes 453 connect the inner space 45d of the connection base portion 45a and the outer space of the connection base portion 45a. Here, in the partition wall 452, a communication hole 453 located on the X1 side (hereinafter, a first communication hole 453*a*) and a communication hole 453 located on the X2 side (hereinafter, a second communication hole 453*b*) are formed. That is, the communication holes 453 includes the first and second communication holes 453*a* and 453*b*. The first communication hole 453*a* and the second communication hole 453*b* are formed in a T-like shape as seen in the Y direction. The through hole 454 penetrates through the partition wall 452 in the Y direction. The through hole 454 is formed in a substantially circular shape as seen in the Y direction.

In the through hole 454 of the partition wall 452, a cover Cv covering the electric wire E is inserted. The electric wire E is provided for supplying electric energy to the end effector 43. The electric wire E electrically connects the end effector and an electric power supply. Note that the electric wire E may be indirectly connected to the end effector 43. For example, the electric wire may be connected to the end effector 43 via the base 45, the end effector support body 44, or the like. The cover Cv covers the electric wire E from the outer side in the D direction.

On an inner surface 455 of the circumferential wall 45*b*, a recessed portion 45*e* is formed. The recessed portion 45*e* includes a plurality (six, in this example) of recessed portions 45*e* on the inner surface 455 of the connection base portion 45*a*. The plurality of recessed portions 45*e* are arranged side by side in the R direction. Each recessed portion 45*e* is formed in a shape recessed toward the outer side in the D direction from the inner circumferential surface 455 of the connection base portion 45*a*.

Figure 11:
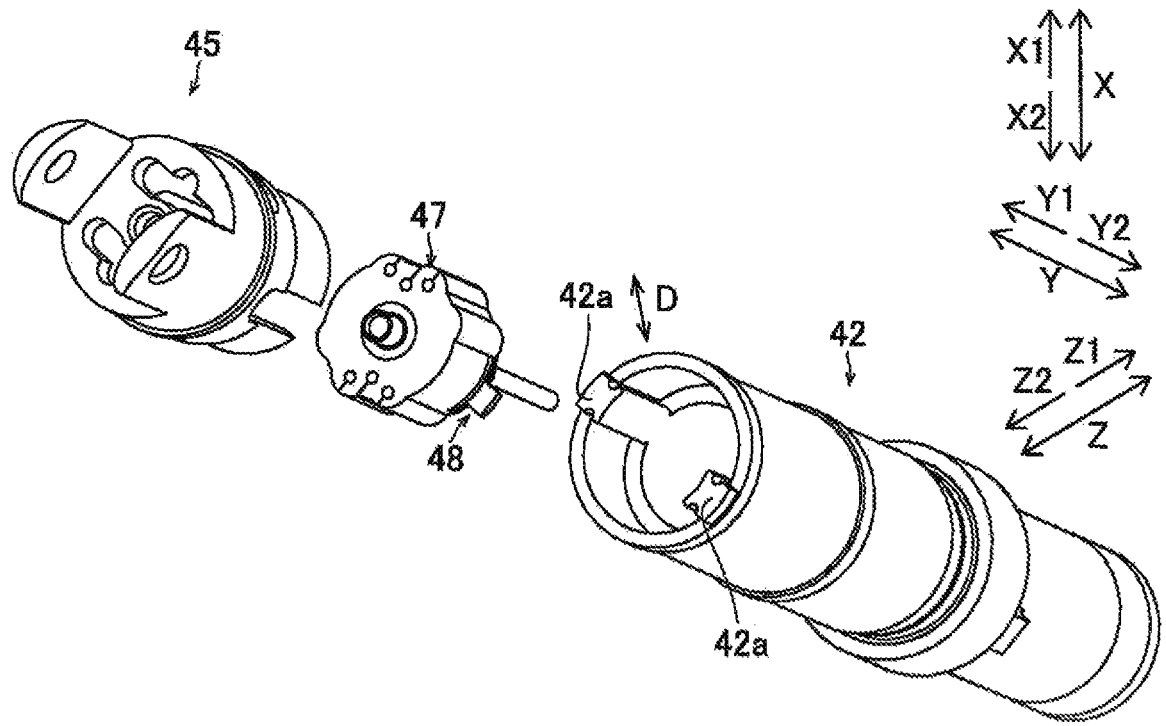
FIG. 11 is a diagram illustrating an exploded perspective view of the surgical instrument according to an embodiment as seen from the Y1 direction.
Figure 12:
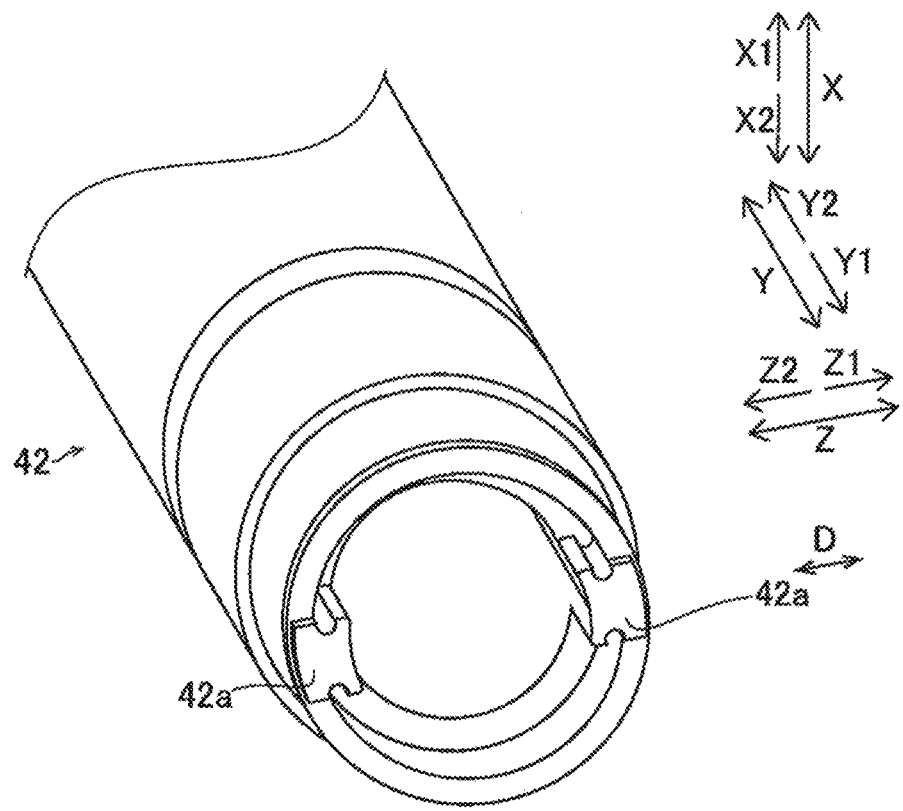
FIG. 12 is a diagram illustrating a perspective view of the shaft according to an embodiment.

As illustrated in FIGS. 11 and 12, the shaft 42 is formed in a cylindrical shape extending along the Y direction. The first elongate element W1, and the second elongate elements W2 are housed in the space inside the shaft 42. The shaft 42 includes a projection 42*a*. The projection 42*a* extends in the Y direction. The projection 42*a* projects from the end of the shaft 42 on the Y1 side toward the end effector 43 side in the Y direction. The projection 42*a* includes a plurality (two, in this example) of projections 42*a* arranged along the R direction.

In the space in the shaft 42, a Y2 side portion of the base 45 is accommodated. In this state, the end of the shaft 42 is in contact with a step portion of the circumferential wall 45*b* of the base 45. Further, the projections 42*a* of the shaft 42 are inserted in the cutouts 451 of the base 45.

(Seal Member)

Figure 13:
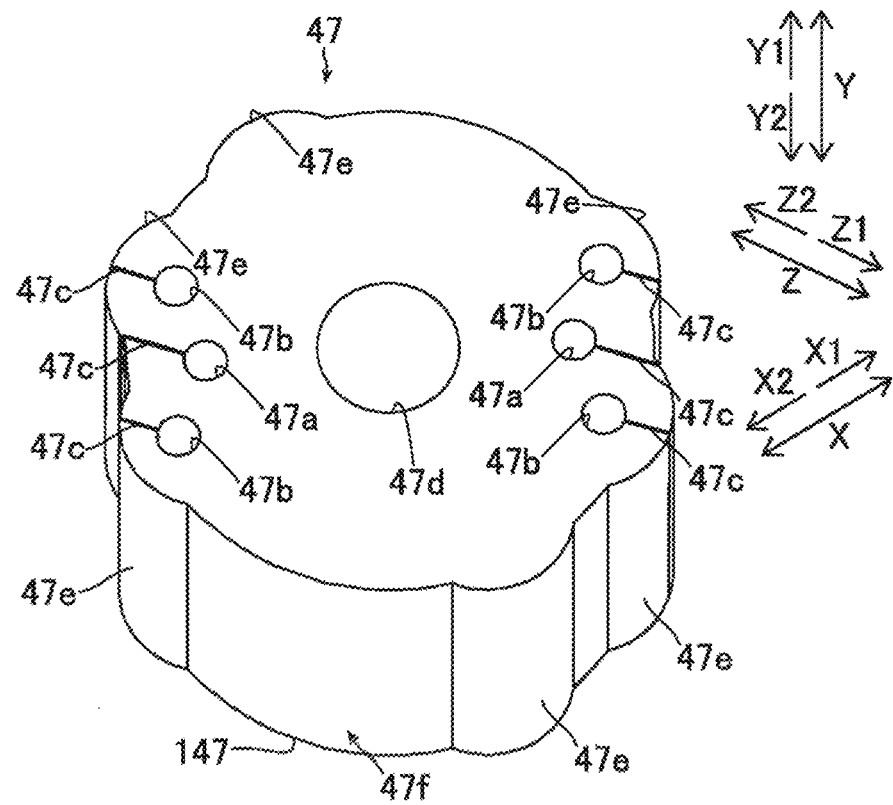
FIG. 13 is a diagram illustrating a perspective view of a seal member according to an embodiment.
Figure 14:
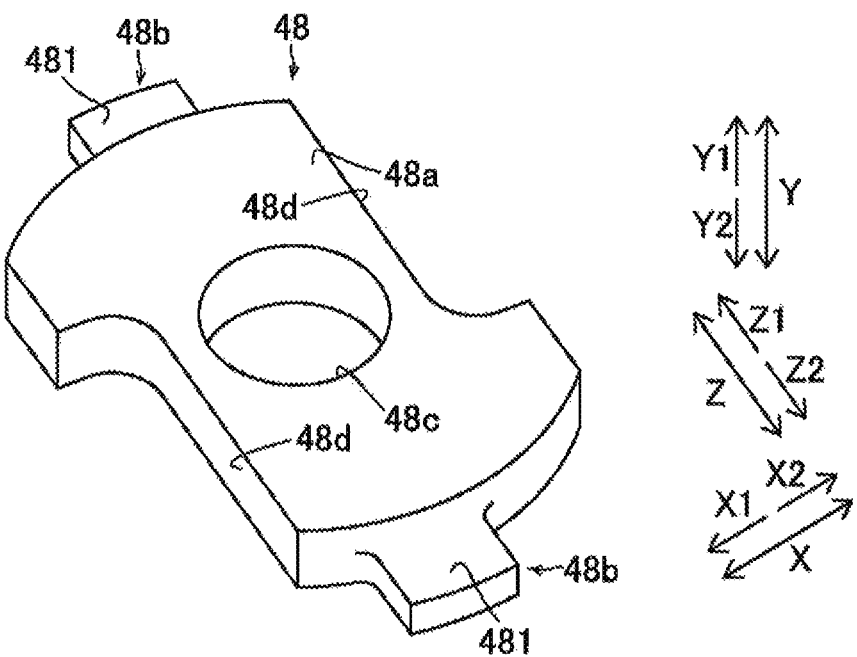
FIG. 14 is a diagram illustrating a perspective view of a retainer according to an embodiment.

As illustrated in FIGS. 13 and 14, the seal member 47 is made of an elastomer such as silicone rubber or the like. The seal member 47 is configured to be elastically deformable. The seal member 47 has a thickness in the Y direction. The seal member 47 is compressed at the end of the inner space 45*d* of the base 45 on the Y1 side. The seal member 47 is in close contact with the partition wall 452 of the base 45.

The seal member 47 closes the first communication hole 453*a* and the second communication hole 453*b* of the base 45. Further, the seal member 47 is configured such that the first elongate element W1 and the second elongate elements W2 are attachable, after the first elongate element W1 is attached to the end effector support body 44 and the second elongate elements W2 are attached to the end effector 43.

Specifically, the seal member 47 includes a first insertion hole 47*a*, a second insertion hole 47*b*, and a slit 47*c*. In the first insertion hole 47*a*, the first elongate element W1 is inserted. The first insertion hole 47*a* penetrates the seal member 47 in the Y direction. The first insertion hole 47*a* includes a plurality (two, in this example) of first insertion holes 47*a* in the seal member 47. In the second insertion hole 47*b*, the second elongate element W2 is inserted. The second insertion hole 47*b* penetrates the seal member 47 in the Y direction. The second insertion hole 47*b* includes a plurality (four, in this example) of second insertion holes 47*b* in the seal member 47.

The slit 47*c* extends from an outer circumferential surface 47*f* of the seal member 47 to the first insertion hole 47*a* or the second insertion hole 47*b*. That is, the slit 47*c* includes a plurality (six, in this example) of slits 47*c* provided in the seal member 47 corresponding to the total number of the first insertion holes 47*a* and the second insertion holes 47*b*. Each of the slits 47*c* connects the outer circumferential surface 47*f* of the seal member 47 to the first insertion hole 47*a* or the second insertion hole 47*b*. With this, the first elongate element W1 is guided by the slit 47*c* extending to the first insertion hole 47*a*, to be inserted from the outer circumferential surface 47*f* of the seal member 47 to the first insertion hole 47*a*. Also, the second elongate element W2 is guided by the slit 47*c* extending to the second insertion hole 47*b*, to be inserted from the outer circumferential surface 47*f* of the seal member 47 to the second insertion hole 47*b*.

The seal member 47 closes a part of the through hole 454 of the base 45 and is in close contact with the cover Cv covering the electric wire E. That is, the seal member 47 includes a through hole 47*d*. In the through hole 47*d* of the seal member 47, the cover Cv covering the electric wire E is inserted. The through hole 47*d* of the seal member 47 penetrates through the seal member 47 in the Y direction. The number of the through hole 47*d* of the seal member 47 provided in the seal member 47 is one.

The seal member 47 is configured to be in close contact with the inner surface 455 (see FIG. 10) of the base 45. Specifically, the seal member 47 includes projected portions 47*e* or convex portions. The projected portions 47*e* are provided at positions corresponding to the second insertion holes 47*b* and to the recessed portions 45*e* of the base 45. That is, a plurality (six, in this example) of the projected portions 47*e* are provided on the outer circumferential surface 47*f* of the seal member 47. Each of the projected portions 47*e* is projected outwardly in the D direction from the outer circumferential surface 47*f* of the seal member 47.

(Retainer)

Figure 15:
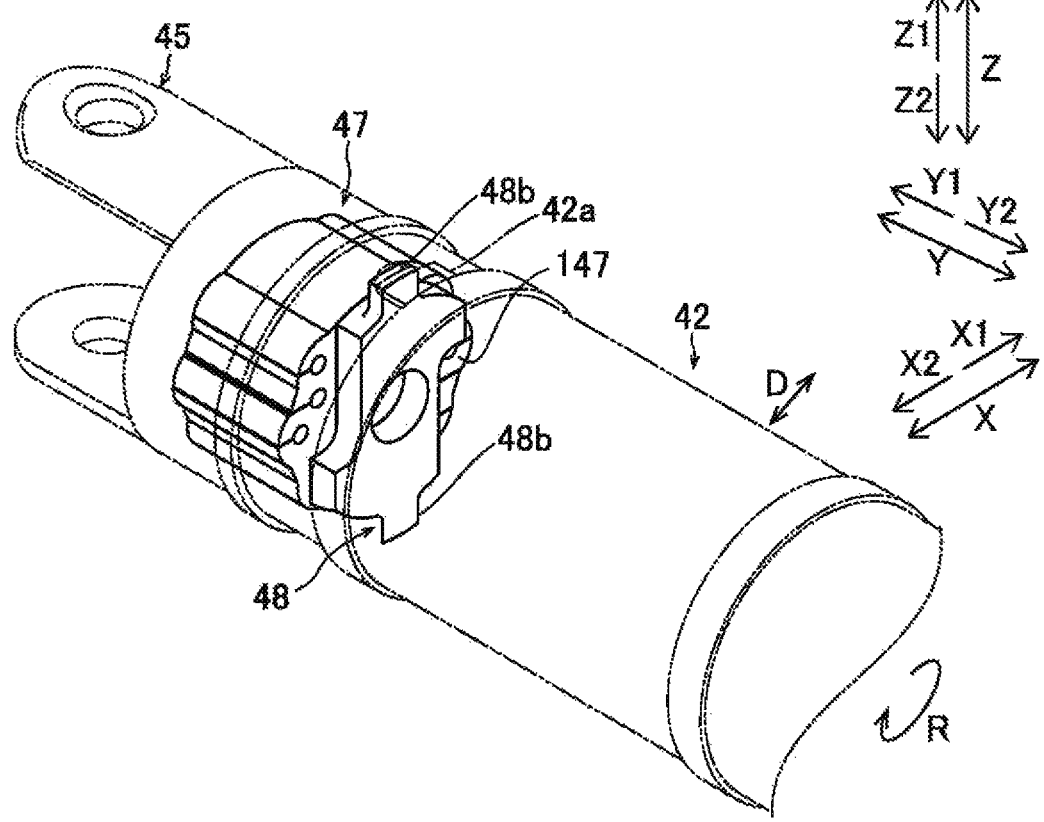
FIG. 15 is a diagram illustrating a perspective view of a state where the seal member is accommodated in the base and compressed by the shaft according to an embodiment.

As illustrated in FIGS. 14 and 15, the retainer 48 according to an embodiment is configured to suppress unevenness in force pressing the surface 147 of the seal member 47 on the shaft 42 side. That is, the retainer 48 is configured to disperse the pressing force applied from the shaft 42 to the surface 147 of the seal member 47 on the shaft 42 side. The retainer 48 is made of a metal such as stainless steel or the like. Note that the retainer 48 is not limited to stainless steel, and may be formed of another material(s) such as metal or resin other than stainless steel, for example.

Specifically, the retainer 48 includes a pressing surface 48*a*, pressed portions 48*b*, a through hole 48*c*, and recessed portions 48*d* (escape portions). The retainer 48 is not in line contact with the surface 147 of the seal member 47 on the shaft 42 side but is in surface contact with the surface 147 by means of the pressing surface 48*a* of the retainer 48. The pressing surface 48*a* is configured as an end surface of the retainer 48 on the end effector 43 side (the Y1 side).

The pressing surface 48*a* extends in the D direction and is in contact with the surface 147 of the seal member 47 on the shaft 42 side in an area from a center portion to an outer portion of the surface 147 in the D direction. The pressing surface 48*a* is pressed against the surface 147 of the seal member 47 on the shaft 42 side.

Accordingly, by means of the pressing surface 48*a* extending in the radial direction (the D direction) of the retainer 48, the surface 147 of the seal member 47 on the shaft 42 side can be more evenly pressed by the shaft 42. As a result, the seal member 47 can be more evenly compressed by the shaft 42.

The pressing surface 48*a* is moved by the movement of the retainer 48 along with the movement of the shaft 42 toward the end effector 43 in the Y direction, so that the pressing surface 48*a* is in surface contact with and thus compresses the seal member 47. Specifically, the base 45 includes the cutouts 451 recessed from the end of the base 45 on the shaft 42 side toward the end effector 43 side in the Y direction. The pressed portions 48*b* of the retainer 48 are arranged in the cutouts 451 of the base 45. The pressed portions 48*b* of the retainer 48 is moved along the cutouts 451 of the base 45 so that the retainer 48 presses the seal member 47 with the pressing surface 48*a*.

Accordingly, when pressing the seal member 47 while the pressed portions 48*b* are moved along with the movement of the shaft 42, the cutouts 451 of the base 45 can guide the movement of the retainer 48 toward the base 45. Further, since the pressed portions 48*b* are arranged in the cutouts 451 of the base 45, it is possible to suppress the movement (stop the rotation) of the retainer 48 in the R direction. As a result, the seal member 47 can be more evenly compressed by the retainer 48.

The retainer 48 is configured to compress the seal member 47 by a predetermined length in the Y direction with the pressing surface 48*a*. Specifically, the retainer 48 is configured to compress the seal member 47 with the pressing surface 48*a* by the predetermined length in such a manner that the seal member 47 is positioned closer to the end effector 43 than the end of the cutout 451 of the base 45 on the end effector 43 side is.

Specifically, the pressing surface 48*a* of the retainer 48 is positioned closer in the Y direction to the end effector 43 (the Y1 side) than the surface 481 of the pressed portion 48*b* on a side away from the shaft 42 (an end effector side surface 481 of the pressed portion 48*b*).

Therefore, compared to a case where the pressing surface 48*a* is flush with the surface 481 of the pressed portion 48*b* on the end effector 43 side, the pressing surface 48*a* can be arranged closer to the Y1 side when the shaft 42 presses the retainer 48 in the Y1 direction. As a result, the seal member 47 can be sufficiently compressed by the retainer 48.

Figure 16:
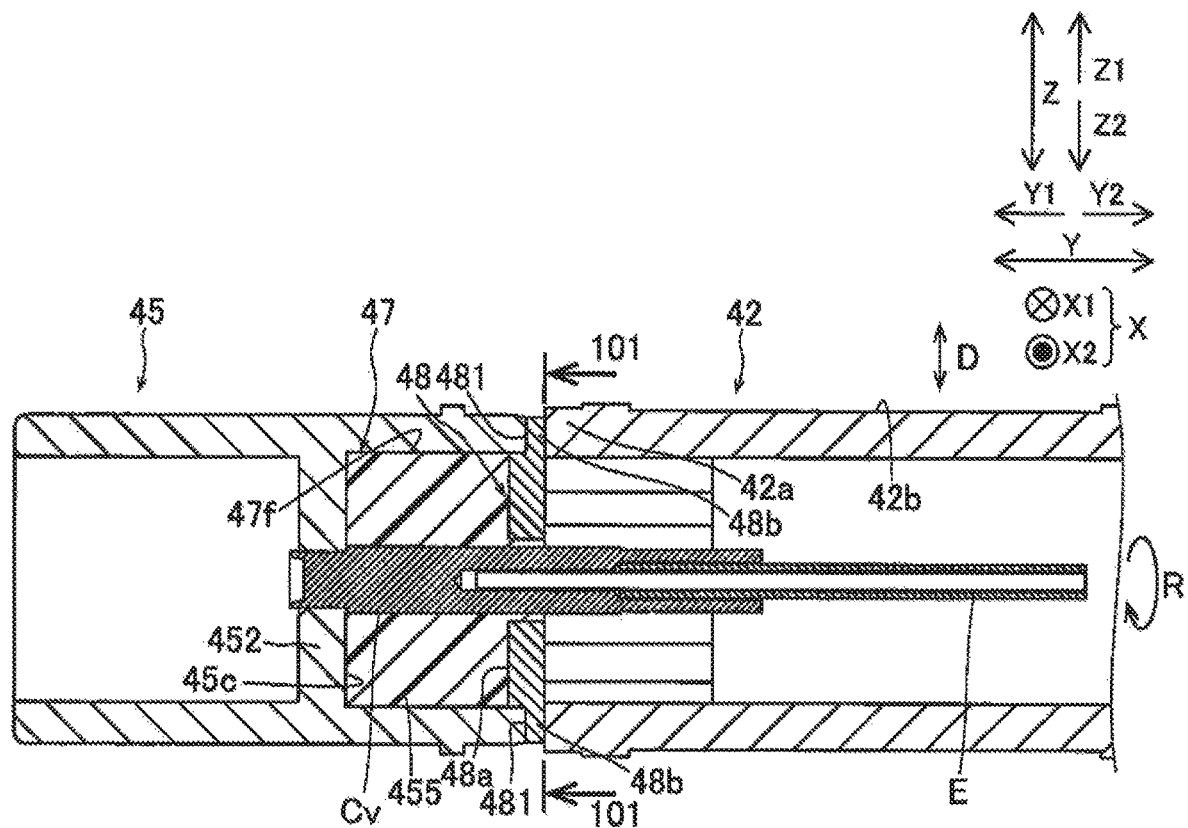
FIG. 16 is a diagram illustrating a cross sectional view of a state where the seal member is accommodated in the base and compressed by the shaft according to an embodiment.

As illustrated in FIGS. 15 and 16, the retainer 48 is configured to receive the pressing force from the shaft 42 at the outer portion of the shaft 42 in the D direction. Specifically, the retainer 48 is configured to receive the pressing force from the shaft 42 at a part of the surface of the retainer 48 opposite to the end effector 43 side in the Y direction. That is, the retainer 48 includes the pressed portions 48*b* that extend from the outer peripheral end of the pressing surface 48*a* outwardly in the D direction and that are pressed by the shaft 42.

With this configuration, it is possible to more easily secure an area(s) pressed by the shaft 42 via the pressed portions 48*b* provided at the outer end of the pressing surface 48*a*, compared to a case where the shaft 42 directly presses the small-sized seal member 47 arranged in the base 45.

Specifically, the pressed portions 48*b* are projected from the outer peripheral end of the pressing surface 48*a* outwardly in the D direction.

With this, the pressed portions 48*b* are not projected to the inside of the shaft 42 where the elongate elements and the electric wire are disposed but are projected toward the outer side of the shaft 42. Therefore, it is possible to more easily secure an area(s) pressed by the shaft 42.

The pressed portions 48*b* are configured to be pressed by the projections 42*a* of the shaft 42. The pressed portion 48*b* are provided at positions corresponding to the projections 42*a* of the shaft 42. That is, the pressed portions 48*b* are provided at positions outside the inner space 45*d* of the base 45 in the D direction.

The shaft 42 includes the projections 42*a* projecting in the Y direction. The pressed portions 48*b* are projected from the outer circumferential end of the pressing surface 48*a* outwardly in the D direction and provided at the positions facing (corresponding to) the projections 42*a* of the shaft 42 in the Y direction.

Accordingly, the pressed portions 48*b* of the retainer 48 and the projections 42*a* of the shaft 42 are disposed facing each other in the Y direction. Thus, the pressed portions 48*b* of the retainer 48 can be pressed more reliably by the shaft 42. As a result, even in a case where there is restriction on layout of the positions pressed by the shaft 42, the seal member 47 can be sufficiently pressed by the shaft 42 toward the base 45 side.

The retainer 48 is configured such that the pressing surface 48*a* of the retainer 48 is parallel to the plane along the D direction in the state where the pressed portions 48 receive the pressing force. That is, the plurality (two, in this example) of the pressed portions 48*b* are provided in the retainer 48 in order to uniformly disperse the pressing force applied to the pressing surface 48*a* to the pressing surface 48*a*.

Specifically, the plurality of the projections 42*a* of the shaft 42 and the plurality of the pressed portions 48*b* of the retainer 48 are arranged in the R direction. The plurality of the projections 42*a* and the plurality of the pressed portions 48*b* are arranged in point symmetry with respect to the center point in the D direction, as seen in the Y direction. The plurality (two) of the projections 42*a*, the plurality (two) of the pressed portions 48*b*, and the plurality (two) of the cutouts 451 are arranged in line symmetry with respect to a line extending in the D direction, as seen in the Y direction.

Since the point-symmetrically arranged plurality of the projections 42*a* press the point-symmetrically arranged plurality of the pressed portions 48*b*, the pressing force from the pressing surface 48*a* of the retainer 48 can be evenly applied to the surface 147 of the seal member 47 on the shaft 42 side. Therefore, the base 45 is stably sealed with the seal member 47.

Each of the pressed portions 48*b* is provided overlapping with the corresponding projection 42*a* of the shaft 42 in the Y direction as seen from the opposite side of the end effector 43 side. That is, in the Y direction, the surface of the projection 42*a* of the shaft 42 on the end effector 43 side is larger than the surface of the pressed portion 48*b* of the retainer on the end shaft 42 side (that is, the opposite side of the end effector 43 side).

Here, the pressed portions 48*b* of the retainer 48 are provided at the positions outside the outer circumferential surface 47*f* of the seal member 47 and inside or same as (flash with) the outer circumferential surface 42*b* of the shaft 42 in the D direction.

Since the pressed portions 48*b* of the retainer 48 are provided at the positions inside or same as the outer circumferential surface 42*b* of the shaft 42 in the D direction, it is possible to avoid formation of protrusions on the outer circumferential surface of the shaft 42. Further, since the pressed portions 48*b* of the retainer 48 are provided at the positions outside the outer circumferential surface 47*f* of the seal member 47 in the D direction, it is possible to securely press the pressed portions 48b of the retainer 48 by the shaft 42 even when the size of the base 45 is small. Therefore, it is possible to make the outer circumferential surface of the shaft 42 smooth and securely seal the base 45.

Figure 17:
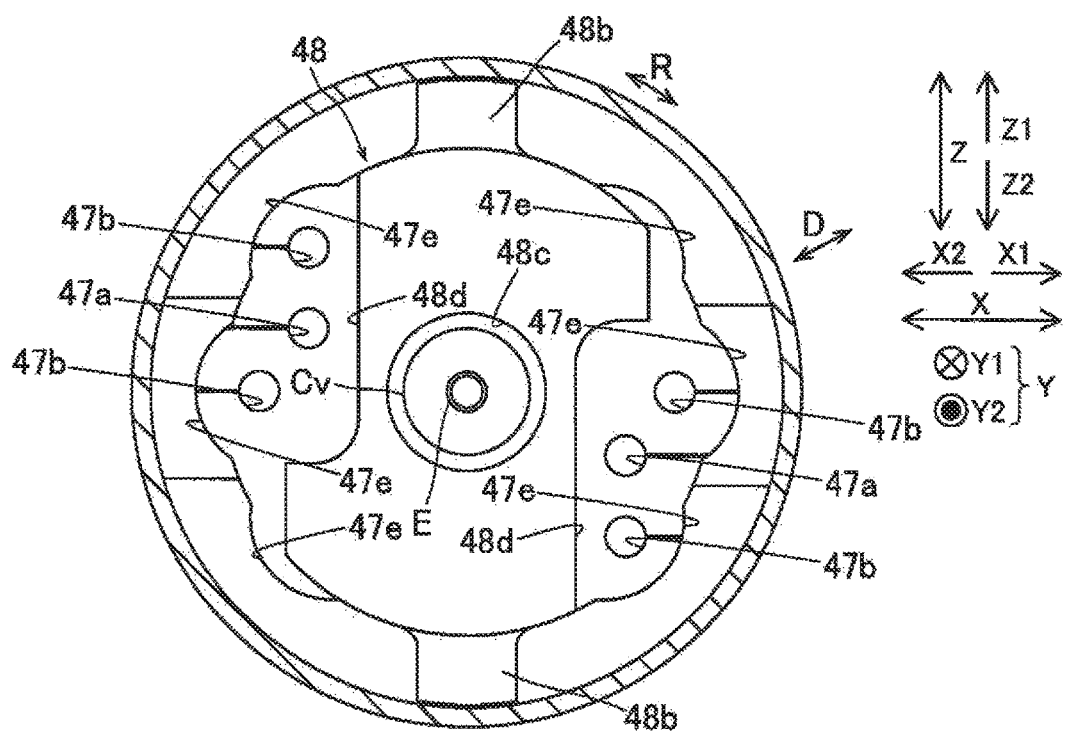
FIG. 17 is a diagram illustrating a cross sectional view along the line 101-101 in FIG. 16.

As illustrated in FIGS. 16 and 17, the through hole 48c of the retainer 48 penetrates through the retainer 48 in the Y direction. The through hole 48c of the retainer 48 has a size in the D direction which allows the cover Cv of the electric wire E to be inserted. The through hole 48c of the retainer 48 is communicated with the through hole 47d of the seal member 47 in the Y direction. That is, the through hole 48c of the retainer 48 is provided at the center portion of the retainer 48 in the D direction.

In this way, the surgical instrument 4 is provided with the electric wire E for supplying electric energy to the end effector 43. The seal member 47 includes the through hole 47d at the position corresponding to the position where the electric wire E is inserted through the seal member 47. The retainer 48 includes the through hole 48c at the position corresponding to the position where the electric wire E is inserted through the seal member 47.

With this, even in the case where the electric wire E is connected to the end effector 43, it is possible to sufficiently compress the seal member 47 by the retainer 48 while securing the sealability of the base 45 by the seal member 47.

The retainer 48 is configured to avoid interference between the retainer 48 and the first and second elongate elements W1 and W2. That is, the recessed portions 48d (escape portions) are provided at the positions around the first and second insertion holes 47a and 47b to which the first and second elongate elements W1 and W2 are inserted.

Specifically, the surgical instrument 4 includes the first elongate element W1 for rotating the end effector support body 44 with respect to the base 45 and the second elongate elements W2 for rotating the end effector 43 with respect to the end effector support body 44. The seal member 47 includes the first insertion holes 47a to which the first elongate element W1 is to be inserted and the second insertion holes 47b to which the second elongate elements W2 are to be inserted. The retainer 48 includes the recessed portions 48d (escape portions) provided at the positions corresponding to the first and second insertion holes 47a and 47b to escape the first and second elongate elements W1 and W2 (avoid interference with the first and second elongate elements W1 and W2).

Accordingly, even in the case where the first elongate element W1 for rotating the end effector support body 44 and the second elongate elements W2 for rotating the end effector 43 are provided, it is possible to avoid interference between the retainer 48 and the first and second elongate elements W1 and W2 since the recessed portions 48d are provided in the retainer 48. As a result, it is possible to stably perform the rotation of the end effector support body 44 by the first elongate element W1 and the rotation of the end effector 43 by the second elongate elements W2 while sufficiently compressing the seal member 47 by the retainer 48.

Further, each of the recessed portions 48d is formed in a cutout shape recessed or concaved from the outer circumferential end of the retainer 48 toward the center of the retainer 48 in the D direction. The plurality (two, in this example) of the recessed portions 48d are arranged along the R direction. The plurality of the recessed portions 48d are arranged in point symmetry with respect to the center point of the retainer 48 or the shaft 42 in the D direction.

Specifically, the base 45 includes the recessed portions 45e recessed outwardly in the D direction from the inner circumferential surface 45s of the base 45 at the positions corresponding to the first and second insertion holes 47a and 47b. The seal member 47 includes the projected portions 47e at the positions corresponding to the recessed portions 45e of the base 45. The recessed portions 48d are provided at the positions corresponding to the projected portions 47e.

With this, it is possible to securely avoid interference between the retainer 48 and the first and second elongate elements W1 and W2 even when the surgical instrument 4 uses the small-sized base 45 which may need the recessed portions 45e. As a result, it is possible to more stably perform the rotation of the end effector support body 44 by means of the first elongate element W1 and the rotation of the end effector 43 by means of the second elongate elements W2 while more sufficiently compressing the seal member 47 by the retainer 48.

(Modifications)

It should be understood that one or more embodiments described above are illustrated by way of example in every respect and not limit the invention. The scope of the invention is defined not by above-described one or more embodiments, but by the scope of claims, and includes all modifications (variations) within equivalent meaning and scope to those of the claims.

For example, in an embodiment described above, the retainer 48 (pressing member) includes the pressed portions 48b that protrude from the outer peripheral end of the pressing surface 48a outwardly in the D direction (radial direction) of the shaft 42. However, the disclosure is not limited to this. In the disclosure, a pressed portion of a pressing member may be not protruded from an outer circumference of a pressing surface outwardly in a radial direction of a shaft. For example, a pressed portion may be provided at a position inside the outer circumference of the pressing surface in the radial direction of the shaft. In this case a part of a surface of a pressing member on an end effector side in a longitudinal direction of a shaft may function as a pressed portion of the pressing member to be pressed by the shaft.

Further, in an embodiment described above, the pressing surface 48a extends in the plane along the D direction (radial direction). However, the disclosure is not limited to this. In the disclosure, plural pressing surfaces may be intermittently provided along the radial direction of the shaft.

Further, in an embodiment described above, the pressing surface 48a is provided closer to the end effector 43 than the surface 48l of the pressed portion 48b on the end effector 43 side (the side opposite from the shaft 42 side) in the axial direction of the shaft 42. However, the disclosure is not limited to this. In the disclosure, the pressing surface and the surface of the pressed portion on the end effector side may be flush with each other with respect to the radial direction of the shaft.

Further, in an embodiment described above, the base 45 (support body) includes the recessed portions 45e recessed outwardly in the D direction from the inner circumferential surface 45s at the positions corresponding to the first and second insertion holes 47a and 47b. However, the disclosure is not limited to this. In the disclosure, the base 45 may not include the recesses.

Further, in an embodiment described above, the seal member 47 includes the projected portions 47e provided at the positions corresponding to the recessed portions 45e of the base 45 (support body). However, the disclosure is not limited to this. In the disclosure, the seal member may not include the projected portions.

Further, in an embodiment described above, the base 45 (support body) includes the cutouts 451 recessed from the end of the base 45 on the shaft 42 side toward the end effector 43 side in the Y direction. However, the disclosure is not limited to this. In the disclosure, the support body may not include the cutouts.

Further, in an embodiment described above, the pressed portions 48b of the pressing member are provided at the positions outside the outer circumferential surface 47f of the seal member 47 and inside or same as the outer circumferential surface 42b of the shaft 42 in the D direction. However, the disclosure is not limited to this. In the disclosure, the pressed portions of the pressing member may be provided at positions outside the outer circumferential surface of the shaft.

The invention claimed is:

1. A surgical instrument to be attached to a robot arm, comprising:
    an end effector;
    an end effector support body that supports the end effector to be rotatable about a first axis;
    a support body that includes a partition wall provided between a proximal end and a distal end of the support body, and that supports the end effector support body to be rotatable about a second axis;
    a shaft including a distal end to which the proximal end of the support body is connected such that the distal end of the shaft is opposed to the proximal end of the support body in an axial direction of the shaft;
    a seal member provided in the support body and seals an inside of the support body; and
    a pressing member provided outside the shaft, formed in a flat plate shape, and including a pressing surface in contact with and pressing a surface of the seal member on a shaft side of the seal member, wherein
    the pressing member comprises a pressed portion provided outside an outer peripheral end of the pressing surface in a radial direction of the shaft,
    the pressed portion projects outwardly in the radial direction of the shaft from the outer peripheral end of the pressing surface in the radial direction,
    the shaft includes a projection that projects in the axial direction of the shaft from the distal end of the shaft,
    the pressed portion is provided at a position opposed to the projection of the shaft in the axial direction of the shaft, and
    the pressed portion of the pressing member is pressed by the projection of the shaft toward the sealing member and the partition wall in the axial direction of the shaft such that the seal member is pressed and held, in the axial direction of the shaft, between the partition wall of the support body and the pressing surface of the pressing member.

2. The surgical instrument according to claim 1, wherein the pressing surface of the pressing member extends in a radial direction of the shaft and is in contact with the surface of the seal member on the shaft side in an area from a center portion to an outer portion thereof in the radial direction, wherein the pressing surface of the pressing member is pressed against the surface of the seal member on the shaft side.

3. The surgical instrument according to claim 1, wherein the projection of the shaft comprises a plurality of projections arranged in a circumferential direction of the shaft, and the pressed portion of the pressing member comprises a plurality of pressed portions arranged in the circumferential direction of the shaft, and
the plurality of projections and the plurality of pressed portions are respectively arranged in point symmetry with respect to a center point of the shaft in the radial direction, as seen in the axial direction of the shaft.

4. The surgical instrument according to claim 1, wherein the pressed portion of the pressing member is provided at a position outside an outer circumferential surface of the seal member in the radial direction of the shaft and inside or same as an outer circumferential surface of the shaft in the radial direction of the shaft.

5. The surgical instrument according to claim 1, wherein the support body includes a cutout recessed from the proximal end of the support body toward the distal end of the support body in the axial direction,
the pressed portion of the pressing member and the projection of the shaft are disposed in the cutout of the support body, and
the pressed portion of the pressing member is pressed by the projection of the shaft toward the sealing member and the partition wall in the axial direction such that the seal member is pressed and held, in the axial direction, between the partition wall of the support body and the pressing surface of the pressing member.

6. The surgical instrument according to claim 5, wherein the cutout of the support body comprises two cutouts, the pressed portion of the pressing member comprises two pressed portions, and the shaft comprises two projections.

7. The surgical instrument according to claim 6, wherein the cutouts of the support body, the pressed portions of the pressing member, and the projections of the shaft are respectively arranged in line symmetry with respect to a line extending in the radial direction of the shaft as seen in the axial direction of the shaft.

8. The surgical instrument according to claim 1, wherein the pressing surface of the pressing member is provided closer to the end effector than an end effector side surface of the pressed portion of the pressing member.

9. The surgical instrument according to claim 1, further comprising an electric wire for supplying electric energy to the end effector, wherein
the seal member includes a through hole at a position corresponding to a position where the electric wire is inserted through the seal member, and
the pressing member includes a through hole at a position corresponding to the position where the electric wire is inserted through the seal member.

10. The surgical instrument according to claim 9, wherein the end effector comprises a scissors.

11. The surgical instrument according to claim 1, further comprising:
a first elongate element for rotating the end effector support body with respect to the support body; and
a second elongate element for rotating the end effector with respect to the end effector support body, wherein
the seal member comprises:
a first insertion hole to which the first elongate element is to be inserted; and
a second insertion hole to which the second elongate element is to be inserted,
the pressing member comprises recessed portions provided at positions corresponding to the first and second insertion holes to avoid interference with the first and second elongate elements.

12. The surgical instrument according to claim 11, wherein
the first and second elongate elements are wires or cables.

13. The surgical instrument according to claim 11, wherein
the partition wall of the support body includes first and second communication holes at positions corresponding to the first and second insertion holes, and
the seal member includes first and second projected portions provided at positions corresponding to the first and second communication holes, and
the recessed portions of the pressing member are provided at positions corresponding to the first and second projected portions of the seal member.

14. The surgical instrument according to claim 1, wherein the seal member is configured to be elastically deformable.

15. The surgical instrument according to claim 1, wherein the pressing member is pressed by the distal end of the shaft so as to press the seal member in a direction away from the shaft along the axial direction of the shaft.

16. The surgical instrument according to claim 1, wherein the projection projects in the axial direction from a part, in the circumferential direction, of the distal end of the shaft.

17. The surgical instrument according to claim 1, wherein
the pressed portion of the pressing member extends further outward in the radial direction of the shaft than the outer circumferential surface of the sealing member.

18. The surgical instrument according to claim 1, wherein the pressing surface of the pressing member extends in a plane orthogonal to the axial direction of the shaft.

19. A surgical instrument to be attached to a robot arm, comprising:
an end effector;
a first support body that supports the end effector to be rotatable about a first axis with respect to the first support body;
a second support body that includes a partition wall provided between a proximal end and a distal end of the second support body, and supports the first support body to rotatable about a second axis with respect to the second support body;
a shaft including a distal end to which the proximal end of the second support body is connected such that the distal end of the shaft is opposed to the proximal end of the support body in an axial direction of the shaft;
a seal member provided in the second support body; and
a pressing member provided outside the shaft, formed in a flat plate shape, and including a pressing surface being in surface contact with and pressing a surface of the seal member on a shaft side of the seal member, wherein
the pressing member comprises a pressed portion provided outside an outer peripheral end of the pressing surface in a radial direction of the shaft,
the pressed portion projects outwardly in the radial direction of the shaft from the outer peripheral end of the pressing surface in the radial direction,
the shaft includes a projection that projects in the axial direction of the shaft from the distal end of the shaft,
the pressed portion is provided at a position opposed to the projection of the shaft in the axial direction of the shaft, and
the pressed portion of the pressing member is pressed by the projection of the shaft toward the sealing member and the partition wall in the axial direction of the shaft such that the seal member is pressed and held, in the axial direction of the shaft, between the partition wall of the second support body and the pressing surface of the pressing member.

20. The surgical instrument according to claim 19, wherein the seal member is pressed and thus compressed by the pressing member.

21. A method of assembling a surgical instrument that comprises: an end effector; a first support body that supports the end effector to be rotatable about a first axis; a second support body that includes a partition wall provided between a proximal end and a distal end of the second support body, and supports the first support body to rotatable about a second axis; a shaft including a distal end to which the proximal end of the second support body is connected such that the distal end of the shaft is opposed to the proximal end of the support body in an axial direction of the shaft; a seal member provided in the support body and seals an inside of the support body; and a pressing member provided outside the shaft, formed in a flat plate shape, and including a pressing surface in contact with and pressing a surface of the seal member on a shaft side of the seal member, wherein the pressing member comprises a pressed portion provided outside an outer peripheral end of the pressing surface in a radial direction of the shaft, the pressed portion projects outwardly in the radial direction of the shaft from the outer peripheral end of the pressing surface in the radial direction, the shaft includes a projection that projects in the axial direction of the shaft from the distal end of the shaft, and the pressed portion is provided at a position opposed to the projection of the shaft in the axial direction of the shaft, the method comprising:
disposing the seal member in the second support body; and
connecting the distal end of the shaft to the proximal end of the second support body with the pressed portion of the pressing member being pressed by the projection of the shaft toward the partition wall and the seal member in the axial direction of the shaft, such that the seal member is pressed by the projection of the shaft and thus pressed and held, in the axial direction of the shaft, between the partition wall of the second support body and the pressing member.

* * * * *